United States Patent
Xue et al.

(10) Patent No.: US 9,246,942 B2
(45) Date of Patent: Jan. 26, 2016

(54) PLATFORM AUTHENTICATION STRATEGY MANAGEMENT METHOD AND DEVICE FOR TRUSTED CONNECTION ARCHITECTURE

(75) Inventors: Yonggang Xue, Beijing (CN); Runtian Kan, Beijing (CN); Yuelei Xiao, Shaanxi (CN); Jun Cao, Shaanxi (CN); Zhenhai Huang, Shaanxi (CN); Ke Wang, Shaanxi (CN); Guoqiang Zhang, Shaanxi (CN); Kelong Yuan, Beijing (CN); Lin Zhu, Beijing (CN); Xiaoyong Liu, Beijing (CN)

(73) Assignee: CHINA IWNCOMM CO., LTD. (CN)

( * ) Notice: Subject to any disclaimer, the term of this patent is extended or adjusted under 35 U.S.C. 154(b) by 474 days.

(21) Appl. No.: 13/813,291

(22) PCT Filed: May 26, 2011

(86) PCT No.: PCT/CN2011/000901
§ 371 (c)(1),
(2), (4) Date: Jan. 30, 2013

(87) PCT Pub. No.: WO2012/013011
PCT Pub. Date: Feb. 2, 2012

(65) Prior Publication Data
US 2013/0133030 A1    May 23, 2013

(30) Foreign Application Priority Data
Jul. 30, 2010  (CN) .......................... 2010 1 0241738

(51) Int. Cl.
*H04L 29/06* (2006.01)
*G06F 21/57* (2013.01)

(52) U.S. Cl.
CPC ............... *H04L 63/20* (2013.01); *G06F 21/57* (2013.01); *H04L 63/10* (2013.01); *H04L 63/0876* (2013.01); *H04L 63/1433* (2013.01)

(58) Field of Classification Search
CPC ... H04L 63/20; H04L 63/205; H04L 63/0823; H04L 63/10; H04L 63/12; H04L 63/1433; G06F 21/57
See application file for complete search history.

(56) References Cited

U.S. PATENT DOCUMENTS

| 5,544,322 A | * | 8/1996 | Cheng | H04L 63/0807 340/5.8 |
| 7,046,680 B1 | * | 5/2006 | McDysan | H04L 45/308 370/395.21 |

(Continued)

FOREIGN PATENT DOCUMENTS

| CN | 101447992 A | 6/2009 |
| CN | 101527636 A | 9/2009 |

(Continued)

OTHER PUBLICATIONS

Zhenyu Wang; Jianhua Huang; Yu Wang; Xiangdong Li; Xuetao Sun; Ruimin Wang, "A Multi-party Contract Signing Protocol and Its Implementation via Trusted Computing," Aug. 29-31, 2009, Computational Science and Engineering, 2009. CSE '09. International Conference, vol. 2, pp. 727,731.*

(Continued)

*Primary Examiner* — Eleni Shiferaw
*Assistant Examiner* — Nelson Giddins
(74) *Attorney, Agent, or Firm* — DLA Piper LLP (US)

(57) ABSTRACT

Provided are a platform authentication strategy management method for trusted connection architecture (TCA), and the trusted network connection (TNC) client, TNC access point and evaluation strategy service provider for implementing the method in the TCA. In the embodiments of the present invention, the platform authentication strategy for the access requester can be configured in the TNC access point or the evaluation strategy service provider, and the platform authentication strategy for the access requester configured in the evaluation strategy service provider can be delivered to the TNC access point. Moreover, a component-type-level convergence platform evaluation strategy can be executed in the TNC access point or the evaluation strategy service provider, to ensure that the realization of the TCA platform authentication has good application extensibility.

14 Claims, 4 Drawing Sheets

(56) References Cited

U.S. PATENT DOCUMENTS

| | | | | |
|---|---|---|---|---|
| 7,484,089 B1* | 1/2009 | Kogen | | H04L 63/062 713/156 |
| 7,849,495 B1* | 12/2010 | Huang | | H04L 63/062 713/153 |
| 8,060,934 B2* | 11/2011 | Cabuk | | G06F 21/57 726/22 |
| 8,266,676 B2* | 9/2012 | Hardjono | | H04L 63/0823 709/229 |
| 8,606,911 B2* | 12/2013 | Raleigh | | H04L 12/14 707/694 |
| 8,695,081 B2* | 4/2014 | Bansal | | H04L 63/102 726/11 |
| 8,732,789 B2* | 5/2014 | Shan | | H04L 63/20 705/2 |
| 8,849,858 B2* | 9/2014 | Lim | | G06F 21/6218 707/785 |
| 2004/0225534 A1* | 11/2004 | Zheng | | G06Q 40/08 705/4 |
| 2005/0138417 A1* | 6/2005 | McNerney | | G06F 21/57 726/4 |
| 2005/0188221 A1* | 8/2005 | Motsinger | | G06F 21/55 726/5 |
| 2006/0069668 A1* | 3/2006 | Braddy | | G06F 17/30867 |
| 2006/0153124 A1* | 7/2006 | Kant | | H04W 8/087 370/328 |
| 2006/0221828 A1* | 10/2006 | Towle | | H04L 12/5695 370/230 |
| 2006/0258350 A1* | 11/2006 | Roy | | H04W 36/0061 455/435.1 |
| 2007/0006309 A1* | 1/2007 | Herbert | | H04L 63/20 726/24 |
| 2007/0104115 A1* | 5/2007 | Decasper | | H04L 12/4641 370/254 |
| 2007/0143629 A1* | 6/2007 | Hardjono | | H04L 63/0823 713/189 |
| 2007/0156858 A1* | 7/2007 | Sood | | H04L 63/102 709/220 |
| 2007/0174429 A1* | 7/2007 | Mazzaferri | | G06F 3/1415 709/218 |
| 2007/0179987 A1* | 8/2007 | Lim | | G06F 21/6218 |
| 2008/0301755 A1* | 12/2008 | Sinha | | H04L 63/20 726/1 |
| 2009/0129594 A1* | 5/2009 | Weissman | | H04L 63/0442 380/255 |
| 2009/0144541 A1* | 6/2009 | Kim | | H04L 63/0869 713/156 |
| 2010/0107223 A1* | 4/2010 | Zheng | | H04L 61/2015 726/3 |
| 2010/0188991 A1* | 7/2010 | Raleigh | | G06Q 10/06375 370/252 |
| 2011/0239271 A1* | 9/2011 | Xiao | | G06F 21/31 726/1 |
| 2011/0302411 A1* | 12/2011 | Liang | | H04L 63/0823 713/158 |
| 2011/0302638 A1* | 12/2011 | Cha | | G06F 21/57 726/6 |
| 2011/0321119 A1* | 12/2011 | Kotani | | G06F 21/606 726/1 |
| 2011/0321134 A1* | 12/2011 | Kotani | | G06F 21/10 726/4 |
| 2012/0131652 A1* | 5/2012 | Anand | | H04L 63/08 726/6 |

FOREIGN PATENT DOCUMENTS

| | | |
|---|---|---|
| CN | 101527718 A | 9/2009 |
| CN | 101572706 A | 11/2009 |
| CN | 101909058 A | 12/2010 |

OTHER PUBLICATIONS

Wen Yingyou; Peng Xuena; Chen Shuyi; Zhao Hong, "A Secure Access Approach of UMTS Terminal Based on Trusted Computing," Apr. 24-25, 2010, Networks Security Wireless Communications and Trusted Computing (NSWCTC), 2010 Second International Conference, vol. 2, pp. 171,175.*

TCG Trusted Network Connect TNC Architecture for Interoperability, Specification Version 1.4, Revision 4, May 18, 2009 Published.

* cited by examiner

US 9,246,942 B2

PLATFORM AUTHENTICATION STRATEGY MANAGEMENT METHOD AND DEVICE FOR TRUSTED CONNECTION ARCHITECTURE

This application is a US National Stage of International Application No. PCT/CN2011/000901, filed May 26, 2011, designating the United States, and claiming the benefit of Chinese Patent Application No. 201010241738.9, filed with the Chinese Patent Office on Jul. 30, 2010 and entitled "Platform Authentication Policy Management Method and Apparatus Applicable to Trusted Connection Architecture", both of which are hereby incorporated by reference in their entireties.

FIELD

The present invention relates to the field of network security technologies and particularly to a platform authentication policy management method and system applicable to a trusted connection architecture.

BACKGROUND

The issue of malicious software, e.g., viruses, worms, etc., has become extremely prominent along with the informationization development. At present there have been more than thirty-five thousand kinds of malicious software, and over forty million computers have been infected annually. It is required for inhibition of such attacks to not only address secured transmission and a check for data input but also prevent from a source, that is, each terminal connected to a network. However, traditional security preventions have failed to defend various types of malicious attacks.

The international Trusted Computing Group (TCG) has established specifically for this issue a trusted computing based network connection specification—Trusted Network Connection (TNC), simply denoted as TCG-TNC, which includes an open terminal integrity framework and a set of standards for guaranteeing secure interoperations. Reference is made to FIG. 1 for a TCG-TNC architecture. The TCG-TNC architecture illustrated in FIG. 1 includes three entities: an access requester, a policy enforcement point and a policy decision point. The TCG-TNC architecture is divided into three layers: a network access layer, an integrity evaluation layer and an integrity measurement layer. The access requester includes components which are an integrity measurement collector, a TNC client and a network access requester, where the integrity measurement collector above the TNC client may be one or more. The policy decision point includes components which are an integrity measurement verifier, a TNC server and a network access authorizer, where the integrity measurement verifier above the TNC server may be one or more. A Policy Enforcement Point Interface (IF-PEP) is an interface between the policy enforcement point and the network access authorizer. A Network Authorization Transport Protocol Interface (IF-T) is an interface between the network access requester and the network access authorizer. A TNC Client-Server Interface (IF-TNCCS) is an interface between the TNC client and the TNC server. A Vendor-Specific IMC-IMV Message Interface (IF-M) is an interface between the integrity measurement collector and the integrity measurement verifier. An Integrity Measurement Collector Interface (IF-IMC) is an interface between the TNC client and the integrity measurement collector. An Integrity Measurement Verifier Interface (IF-IMV) is an interface between the TNC server and the integrity measurement verifier.

Since the policy enforcement point in the TCG-TNC architecture is located at the edge of a network and the access requester performs no platform authentication on the policy enforcement point, the architecture suffers from the problem of the policy enforcement point being not trusted. In order address this problem, there is proposed a TNC architecture based upon Tri-element Peer Authentication (TePA), which is simply referred to as a Trusted Connection Architecture (TCA). Reference is made to FIG. 2 for the TCA. The TCA illustrated in FIG. 2 includes three entities: an access requester, an access controller and a policy manager. The TCA is divided into three layers: a network access control layer, a trusted platform evaluation layer and an integrity measurement layer. The access requester includes components which are an integrity measurement collector, a TNC client and a network access requester, where the integrity measurement collector above the TNC client may be one or more. The access controller includes components which are an integrity measurement collector, a TNC access point and a network access controller, where the integrity measurement collector above the TNC access point may be one or more. The policy manager includes components which are an integrity measurement verifier, an evaluation policy server and an authentication policy server, where the integrity measurement verifier above the evaluation policy server may be one or more. An Authentication Policy Server Interface (IF-APS) is an interface between the network access controller and the authentication policy server. A Trusted Network Transport Interface (IF-TNT) is an interface between the network access requester and the network access controller. An Evaluation Policy Server Interface (IF-EPS) is an interface between the TNC access point and the evaluation policy server. A TNC Client-TNC Access Point Interface (IF-TNCCAP) is an interface between the TNC client and the TNC access point. An Integrity Measurement Interface (IF-IM) is an interface between the integrity measurement collector and the integrity measurement verifier. An Integrity Measurement Collector Interface (IF-IMC) is an interface between the TNC client and the integrity measurement collector and between the TNC access point and the integrity measurement collector. An Integrity Measurement Verifier Interface (IF-IMV) is an interface between the evaluation policy server and the integrity measurement verifier.

In the TCA illustrated in FIG. 2, a method of performing platform authentication is implemented as follows: the integrity Measurement Collector (IMC), the Integrity Measurement Verifier (IMV), the TNC client, the TNC access point and the evaluation policy server perform one or more platform authentication processes, where the platform authentication processes other than the first platform authentication process are platform authentication processes performed after a platform is remedied, and each platform authentication process includes one or more rounds of a platform authentication protocol. Platform authentication policy management is performed throughout the method of performing platform authentication in the TCA and is an important component part of performing platform authentication in the TCA. However a corresponding solution to platform authentication policy management has been absent in the existing method of performing platform authentication in the TCA.

SUMMARY

In order to address the foregoing technical problem in the prior art, embodiments of the invention provide a platform authentication policy management method applicable to a trusted connection architecture and a TNC client, a TNC access point and an evaluation policy server performing this method in a trusted connection architecture.

Firstly an embodiment of the invention provides a first platform authentication policy management method applicable to a trusted connection architecture, which includes:

the step 1 of configuring, on a TNC client, first platform authentication policies including a platform authentication management policy of an access requester, platform configuration protection policies of the access requester, platform evaluation policies for an access controller and a platform authentication action recommendation generation policy of the access requester; and configuring, on a TNC access point or an evaluation policy server, second platform authentication policies including a platform authentication management policy of the access controller, platform configuration protection policies of the access controller, platform evaluation policies for the access requester and a platform authentication action recommendation generation policy of the access controller;

the step 2 of, if the second platform authentication policies are configured on the evaluation policy server, then the TNC access point requesting the evaluation policy server for the second platform authentication policies, and then the evaluation policy server transmitting the configured second platform authentication policies to the TNC access point;

the step 3 of the TNC access point generating and transmitting to the TNC client a first set of component measurement request parameters and platform evaluation policies for the access requester under the platform authentication management policy of the access controller and the platform evaluation policies for the access requester among the second platform authentication policies to initiate one round of a platform authentication protocol, where if the first set of component measurement request parameters are all of component measurement request parameters for the access requester, then the platform evaluation policies for the access requester include a component type-level convergence platform evaluation policy;

the step 4 of the TNC client, upon reception of the first set of component measurement request parameters and the platform evaluation policies for the access requester, obtaining a first set of component measurements corresponding to the first set of component measurement request parameters, generating protection policies of the access requester corresponding to the first set of component measurement request parameters and transmitting the first set of component measurements, the received platform evaluation policies of the access requester and the generated protection policies of the access requester to the TNC access point;

the step 5 of the TNC access point receiving and forwarding to the evaluation policy server the first set of component measurements, the platform evaluation policies of the access requester and the protection policies of the access requester transmitted from the TNC client;

the step 6 of the evaluation policy server, for each component type identifier, transmitting the following information corresponding to the component type identifier in the first set of component measurements to corresponding upper integrity measurement verifiers:

information a which is the component measurements;

information b which is the platform configuration protection policy corresponding to the component type identifier among the platform configuration protection policies of the access requester corresponding to the first set of component measurement request parameters; and information c which is the platform evaluation policy corresponding to the component type identifier among the platform evaluation policies for the access requester corresponding to the first set of component measurement request parameters.

then these integrity measurement verifiers returning component product-level platform evaluation results, a difference platform evaluation policy and component remediation information corresponding to the component type identifier;

if the first set of component measurement request parameters are all of the component measurement request parameters for the access requester, then the evaluation policy server converging the difference platform evaluation policies and the component remediation information corresponding to these component type identifiers into difference platform evaluation policies for the access requester and component remediation information for the access requester corresponding to the first set of component measurement request parameters; and if the platform evaluation policies for the access requester corresponding to the first set of component measurement request parameters include a component type-level convergence platform evaluation policy, then the evaluation policy server converging component type-level platform evaluation results corresponding to these component type identifiers into a platform-level platform evaluation result for the access requester corresponding to the first set of component measurement request parameters under the component type-level convergence platform evaluation policy among the platform evaluation policies for the access requester corresponding to the first set of component measurement request parameters;

the step 7 of, if the first set of component measurement request parameters are all of the component measurement request parameters for the access requester and the platform evaluation policies for the access requester corresponding to the first set of component measurement request parameters do not include a component type-level convergence platform evaluation policy, then the TNC access point converging the component type-level platform evaluation results generated by the evaluation policy server in the current round of the platform authentication protocol into a platform-level platform evaluation result for the access requester corresponding to the first set of component measurement request parameters;

the TNC access point transmitting the component remediation information for the access requester corresponding to the first set of component measurement request parameters to respective corresponding integrity measurement collectors above the TNC access point per component type identifier; and the TNC access point transmitting the platform-level platform evaluation result for the access requester and the information transmitted from the evaluation policy server in the step 6 to the TNC client;

the step 8 of the TNC client generating and transmitting to the TNC access point a platform action recommendation of the access requester;

the step 9 of the TNC access point transmitting the platform authentication action recommendation of the access requester to the respective corresponding upper integrity measurement collectors.

Preferably the TNC client obtaining a first set of component measurements corresponding to the first set of component measurement request parameters upon reception of the first set of component measurement request parameters in the step 4 includes:

the TNC client transmitting the component measurement request parameter corresponding to each component type identifier in the first set of component measurement request parameters to respective integrity measurement collectors corresponding to the TNC client upon reception of the first set of component measurement request parameters, then these integrity measurement collectors returning component measurements corresponding to the respective component type identifiers respectively to the TNC client, and the TNC client converging the received component measurements corresponding to the respective component type identifiers into the first set of component measurements corresponding to the first set of component measurement request parameters.

Furthermore if the first set of component measurement request parameters are a part of the component measurement request parameters for the access requester, then:

the step 6 further includes: the evaluation policy server converging the respective component product-level platform evaluation results corresponding to the component type identifier into a component type-level platform evaluation result under the platform evaluation policy corresponding to the component type identifier among the platform evaluation policies for the access requester corresponding to the first set of component measurement request parameters, where a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information c, and each component attribute-level platform evaluation result corresponding to the component product sequence number is generated by the integrity measurement verifiers under a platform evaluation policy corresponding to the component attribute identifier corresponding to the component product sequence number in the information c and a platform evaluation policy corresponding to the component attribute identifier of the component product sequence number in the information b; and the step 7 further includes: if parts of the component measurement request parameters for the access requester generated in respective rounds of the platform authentication protocol constitute all of the component measurement request parameters for the access requester, then the TNC access point converging the component type-level platform evaluation results generated by the evaluation policy server in the respective rounds of the platform authentication protocol and converging the difference platform evaluation polices and the component remediation information generated by the evaluation policy server in the respective rounds of the platform authentication protocol into difference platform evaluation polices and component remediation information for the access requester; otherwise, the TNC access point initiating another round of the platform authentication protocol at the end of the current round of the platform authentication protocol.

Still furthermore the step 4 further includes: generating a second set of component measurement request parameters for the access controller under the first platform authentication management policy of the access requester and the second platform evaluation policies of the access controller; and if the second set of component measurement request parameters are all of component measurement request parameters for the access controller, then generating platform evaluation policies for the access controller corresponding to the second set of component measurement request parameters under the second platform evaluation policies, where the platform evaluation policies for the access controller corresponding to the second set of component measurement request parameters comprise a component type-level convergence platform evaluation policy, and transmitting the generated information together to the TNC access point;

the step 5 further includes: for the component measurement request parameter corresponding to each component type identifier in the second set of component measurement request parameters, the TNC access point obtaining component measurements of the access controller corresponding to the second set of component measurement request parameters; and the TNC access point generating platform configuration protection polices of the access controller corresponding to the second set of component measurement request parameters under the second platform configuration protection polices and transmitting the generated information together to the evaluation policy server;

the step 6 further includes: for each component type identifier in the second set of component measurement request parameters, the evaluation policy server transmitting the following information to the corresponding upper integrity measurement verifiers:

information d which is a second set of component measurements;

information e which is the platform configuration protection policy corresponding to the component type identifier among the platform configuration protection policies of the access controller corresponding to the second set of component measurement request parameters; and information f which is the platform evaluation policy corresponding to the component type identifier among the platform evaluation policies of the access controller corresponding to the second set of component measurement request parameters;

then these integrity measurement verifiers returning component product-level platform evaluation results, a difference platform evaluation policy and component remediation information corresponding to the component type identifier;

next the evaluation policy server converging the respective component product-level platform evaluation results corresponding to the component type identifier into a component type-level platform evaluation result under the platform evaluation policy corresponding to the component type identifier among the platform evaluation policies for the access controller corresponding to the second set of component measurement request parameters, where a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information f, and each component attribute-level platform evaluation result corresponding to the component product sequence number is generated by the integrity measurement verifiers under a platform evaluation policy corresponding to the component attribute identifier corresponding to the component product sequence number in the information f and a platform evaluation policy corresponding to the component attribute identifier of the component product sequence number in the information e; and if the second set of component measurement request parameters are all of the component measurement request parameters for the access controller, then converging the difference platform evaluation policies corresponding to these component type identifiers into difference platform evaluation policies for the access controller corresponding to the second set of component measurement request parameters, and converging the component remediation information corresponding to these component type identifiers into component remediation information for the access controller corresponding to the second set of component measurement request parameters; and if the platform evaluation policies for the access controller corresponding to the second set of component measurement request parameters include a component type-level convergence platform evaluation policy, then the evaluation policy server converging the component type-level platform evaluation results corresponding to these component type identifiers into a platform-level platform evaluation result for the access controller corresponding to the second set of component measurement request parameters under the component type-level convergence platform evaluation policy among the platform evaluation policies for the access controller corresponding to the second set of component measurement request parameters and transmitting the generated information to the TNC access point;

the step 7 further includes: if the TNC access point is not required to initiate another round of the platform authentication protocol, then generating and transmitting to the TNC client a platform authentication action recommendation of the access controller; and the step 8 further includes: if the second set of component measurement request parameters are all of the component measurement request parameters for the access controller and the platform evaluation policies for the access controller corresponding to the second set of component measurement request parameters do not include a component type-level convergence platform evaluation policy, then the TNC client converging the component type-level platform evaluation results corresponding to the respective component type identifiers generated by the evaluation policy server in the step 6) in the current round of the platform authentication protocol into a platform-level platform evaluation result for the access controller corresponding to the second set of component measurement request parameters under the component type-level convergence platform evaluation policy among the platform evaluation policies for the access controller corresponding to the second set of component measurement request parameters;

the TNC client transmitting the component remediation information for the access controller corresponding to the second set of component measurement request parameters to respective corresponding integrity measurement collectors above the TNC client per component type identifier; and if the information transmitted from the TNC access point in the step 7 includes the platform authentication action recommendation of the access controller, then the TNC clients transmitting the platform authentication action recommendation of the access controller to the respective corresponding integrity measurement collectors above the TNC client.

Preferably the TNC access point obtaining component measurements of the access controller corresponding to the second set of component measurement request parameters in the step 4 further includes: the TNC access point transmitting the component measurement request parameter corresponding to the component type identifier to the respective corresponding integrity measurement collectors above the TNC access point, then these integrity measurement collectors returning component measurements corresponding to the component type identifier to the TNC access point, and finally the TNC access point converging the received component measurements into component measurements of the access controller corresponding to the second set of component measurement request parameters.

Furthermore if the second set of component measurement request parameters are a part of the component measurement request parameters for the access controller, then:

the step 8 further includes: if parts of the component measurement request parameters for the access controller generated by the TNC client in the respective rounds of the platform authentication protocol constitute all of the component measurement request parameters for the access controller, then the TNC client converging the component type-level platform evaluation results corresponding to the respective component type identifiers generated by the evaluation policy server in the respective rounds of the platform authentication protocol and converging the difference platform evaluation polices and the component remediation information generated by the evaluation policy server in the respective rounds of the platform authentication protocol into difference platform evaluation polices and component remediation information for the access controller corresponding to the second set of component measurement request parameters; otherwise, the TNC client initiating another round of the platform authentication protocol at the end of the current round of the platform authentication protocol; and if another round of the platform authentication protocol initiated from the TNC access point has not been received in a specific period of time, then the TNC client initiating on its own initiative another round of the platform authentication protocol.

Still furthermore the step 4 further includes: the TNC client further transmitting a platform identity certificate of the access requester to the TNC access point;

the step 5 further includes: the TNC access point verifying a platform signature in the first set of component measurements against the platform identity certificate of the access requester, and the TNC access point further transmitting the platform identity certificate of the access requester and a platform identity certificate of the access controller to the evaluation policy server;

the step 6 further includes: the evaluation policy server verifying the platform identity certificate of the access requester and the platform identity certificate of the access controller, generating a platform identity certificate verification result of the access requester and a platform identity certificate verification result of the access controller, and transmitting the verification results to the TNC access point;

the step 7 further includes: the TNC access point determining whether the platform identity certificate of the access requester is valid according to the platform identity certificate verification result of the access requester, and transmitting the platform identity certificate and the platform identity certificate verification result of the access controller to the TNC client; an the step 8 further includes: the TNC client verifying a platform signature in a second set of component measurements against the platform identity certificate of the access controller, and determining whether the platform identity certificate of the access controller is valid according to the platform identity certificate verification result of the access controller.

An embodiment of the invention provides a second platform authentication policy management method applicable to a trusted connection architecture, which includes:

the step 1 of configuring, on a TNC client, first platform authentication policies including a platform authentication management policy of an access requester, platform configuration protection policies of the access requester, platform evaluation policies for an access controller and a platform authentication action recommendation generation policy of the access requester; and configuring, on a TNC access point or an evaluation policy server, second platform authentication policies including a platform authentication management policy of the access controller, platform configuration protection policies of the access controller, platform evaluation policies for the access requester and a platform authentication action recommendation generation policy of the access controller;

the step 2 of, if the second platform authentication policies are configured on the evaluation policy server, then the TNC access point requesting the evaluation policy server for the second platform authentication policies, and then the evaluation policy server transmitting the configured second platform authentication policies to the TNC access point;

the step 3 of the TNC access point generating and transmitting to the TNC client a first set of component measurement request parameters and platform evaluation policies for the access requester under the platform authentication management policy of the access controller and the platform evaluation policies for the access requester among the second platform authentication policies to initiate one round of a platform authentication protocol;

the step 4 of the TNC client generating a second set of component measurement request parameters for the access controller under the first platform authentication management policy of the access requester and the second platform evaluation policies of the access controller; and if the second set of component measurement request parameters are all of component measurement request parameters for the access controller, then generating platform evaluation policies for the access controller corresponding to the second set of component measurement request parameters under the second platform evaluation policies, wherein the platform evaluation policies for the access controller corresponding to the second set of component measurement request parameters comprise a component type-level convergence platform evaluation policy, and transmitting the generated information to the TNC access point;

the step 5 of, for the component measurement request parameter corresponding to each component type identifier in the second set of component measurement request parameters, the TNC access point obtaining component measurements of the access controller corresponding to the second set of component measurement request parameters; and the TNC access point generating platform configuration protection polices of the access controller corresponding to the second set of component measurement request parameters under the second platform configuration protection polices and transmitting the generated information together to the evaluation policy server;

the step 6 of, for each component type identifier in the second set of component measurement request parameters, the evaluation policy server transmitting the following information to corresponding upper integrity measurement verifiers:

information d which is a second set of component measurements;

information e which is the platform configuration protection policy corresponding to the component type identifier among the platform configuration protection policies of the access controller corresponding to the second set of component measurement request parameters; and information f which is the platform evaluation policy corresponding to the component type identifier among the platform evaluation policies of the access controller corresponding to the second set of component measurement request parameters;

then these integrity measurement verifiers returning component product-level platform evaluation results, a difference platform evaluation policy and component remediation information corresponding to the component type identifier;

next the evaluation policy server converging the respective component product-level platform evaluation results corresponding to the component type identifier into a component type-level platform evaluation result under the platform evaluation policy corresponding to the component type identifier among the platform evaluation policies for the access controller corresponding to the second set of component measurement request parameters, wherein a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information f, and each component attribute-level platform evaluation result corresponding to the component product sequence number is generated by the integrity measurement verifiers under a platform evaluation policy corresponding to the component attribute identifier corresponding to the component product sequence number in the information f and a platform evaluation policy corresponding to the component attribute identifier of the component product sequence number in the information e; and if the second set of component measurement request parameters are all of the component measurement request parameters for the access controller, then converging the difference platform evaluation policies corresponding to these component type identifiers into difference platform evaluation policies for the access controller corresponding to the second set of component measurement request parameters, and converging the component remediation information corresponding to these component type identifiers into component remediation information for the access controller corresponding to the second set of component measurement request parameters; and if the platform evaluation policies for the access controller corresponding to the second set of component measurement request parameters include a component type-level convergence platform evaluation policy, then the evaluation policy server converging the component type-level platform evaluation results corresponding to these component type identifiers into a platform-level platform evaluation result for the access controller corresponding to the second set of component measurement request parameters under the component type-level convergence platform evaluation policy among the platform evaluation policies for the access controller corresponding to the second set of component measurement request parameters and transmitting the generated information to the TNC access point;

the step 7 of, if the TNC access point is not required to initiate another round of the platform authentication protocol, then generating and transmitting to the TNC client a platform authentication action recommendation of the access controller; and the step 8 of, if the second set of component measurement request parameters are all of the component measurement request parameters for the access controller and the platform evaluation policies for the access controller corresponding to the second set of component measurement request parameters do not include a component type-level convergence platform evaluation policy, then the TNC client converging the component type-level platform evaluation results corresponding to the respective component type identifiers generated by the evaluation policy server in the step 6) in the current round of the platform authentication protocol into a platform-level platform evaluation result for the access controller corresponding to the second set of component measurement request parameters under the component type-level convergence platform evaluation policy among the platform evaluation policies for the access controller corresponding to the second set of component measurement request parameters; and the step 9 of the TNC client transmitting the component remediation information for the access controller corresponding to the second set of component measurement request parameters to respective corresponding integrity measurement collectors above the TNC client per component type identifier; and if the information transmitted from the TNC access point in the step 7 includes the platform authentication action recommendation of the access controller, then the TNC clients transmitting the platform authentication action recommendation of the access controller to the respective corresponding integrity measurement collectors above the TNC client.

Furthermore the TNC access point obtaining component measurements of the access controller corresponding to the second set of component measurement request parameters in the step 4 further includes: the TNC access point transmitting the component measurement request parameter corresponding to the component type identifier to respective corresponding integrity measurement collectors above the TNC access point, then these integrity measurement collectors returning component measurements corresponding to the component type identifier to the TNC access point, and finally the TNC access point converging the received component measurements into component measurements of the access controller corresponding to the second set of component measurement request parameters.

If the second set of component measurement request parameters are a part of the component measurement request parameters for the access controller, then:

the step 8 further includes: if parts of the component measurement request parameters for the access controller generated by the TNC client in respective rounds of the platform authentication protocol constitute all of the component measurement request parameters for the access controller, then the TNC client converging the component type-level platform evaluation results corresponding to the respective component type identifiers generated by the evaluation policy server in the respective rounds of the platform authentication protocol and converging the difference platform evaluation polices and the component remediation information generated by the evaluation policy server in the respective rounds of the platform authentication protocol into difference platform evaluation polices and component remediation information for the access controller corresponding to the second set of component measurement request parameters; otherwise, the TNC client initiating another round of the platform authentication protocol at the end of the current round of the platform authentication protocol; and if another round of the platform authentication protocol initiated from the TNC access point has not been received in a specific period of time, then the TNC client initiating on its own initiative another round of the platform authentication protocol.

An embodiment of the invention provides a client in a trusted connection architecture TNC, which includes:

a first configuring unit configured to receive configured first platform authentication policies including a platform authentication management policy of an access requester, platform configuration protection policies of the access requester, platform evaluation policies for an access controller and a platform authentication action recommendation generation policy of the access requester;

a first obtaining unit configured, upon reception of a first set of component measurement request parameters and platform evaluation policies for the access requester, to obtain a first set of component measurements corresponding to the first set of component measurement request parameters, to generate protection policies of the access requester corresponding to the first set of component measurement request parameters and to transmit the first set of component measurements, the received platform evaluation policies of the access requester and the generated protection policies of the access requester to a TNC access point; and a first generating unit configured to generate and transmit to the TNC access point a platform action recommendation of the access requester.

An embodiment of the invention provides a first access point in a trusted connection architecture TNC, which includes:

a second configuring unit configured to receive configured second platform authentication policies including a platform authentication management policy of an access controller, platform configuration protection policies of the access controller, platform evaluation policies for an access requester and a platform authentication action recommendation generation policy of the access controller; or, when the second platform authentication policies are configured on an evaluation policy server, to request the evaluation policy server for the second platform authentication policies and to receive the second platform authentication policies transmitted from the evaluation policy server;

a second generating unit configured to generate and transmit to a TNC client a first set of component measurement request parameters and platform evaluation policies for the access requester under the platform configuration protection policies of the access controller and the platform evaluation policies for the access requester among the second platform authentication policies to initiate one round of a platform authentication protocol, wherein if the first set of component measurement request parameters is all of component measurement request parameters for the access requester, then the platform evaluation policies for the access requester include a component type-level convergence platform evaluation policy;

a forwarding unit configured to receive and forward, to the evaluation policy server, a first set of component measurements, the platform evaluation policies of the access requester and protection policies of the access requester transmitted from the TNC client; and a second obtaining unit configured, when the first set of component measurement request parameters are all of the component measurement request parameters for the access requester and the platform evaluation policies for the access requester corresponding to the first set of component measurement request parameters do not include a component type-level convergence platform evaluation policy, for the TNC access point to converge component type-level platform evaluation results generated by the evaluation policy server in the current round of the platform authentication protocol into a platform-level platform evaluation result for the access requester corresponding to the first set of component measurement request parameters; to transmit component remediation information for the access requester corresponding to the first set of component measurement request parameters to respective corresponding integrity measurement collectors above the TNC access point per component type identifier; and to transmit the platform-level platform evaluation result for the access requester and the information transmitted from the evaluation policy server to the TNC client.

An embodiment of the invention provides a first evaluation policy server in a TNC, which includes:

a receiving unit configured to receive a first set of component measurements; and a third obtaining unit configured, for each component type identifier, to transmit the following information corresponding to the component type identifier in the first set of component measurements to corresponding upper integrity measurement verifiers:

information a which is the component measurements;

information b which is a platform configuration protection policy corresponding to the component type identifier among platform configuration protection policies of an access requester corresponding to a first set of component measurement request parameters; and information c which is a platform evaluation policy corresponding to the component type identifier among platform evaluation policies for the access requester corresponding to the first set of component measurement request parameters.

then these integrity measurement verifiers return component product-level platform evaluation results, a difference platform evaluation policy and component remediation information corresponding to the component type identifier;

if the first set of component measurement request parameters are all of component measurement request parameters for the access requester, then the difference platform evaluation policies and the component remediation information corresponding to these component type identifiers are converged into difference platform evaluation policies for the access requester and component remediation information for the access requester corresponding to the first set of component measurement request parameters; and if the platform evaluation policies for the access requester corresponding to the first set of component measurement request parameters include a component type-level convergence platform evaluation policy, then component type-level platform evaluation results corresponding to these component type identifiers are converged into a platform-level platform evaluation result for the access requester corresponding to the first set of component measurement request parameters under the component type-level convergence platform evaluation policy among the platform evaluation policies for the access requester corresponding to the first set of component measurement request parameters; and if the first set of component measurement request parameters are all of the component measurement request parameters for the access requester and the platform evaluation policies for the access requester corresponding to the first set of component measurement request parameters do not include a component type-level convergence platform evaluation policy, then a TNC access point converges component type-level platform evaluation results generated by an evaluation policy server in the current round of a platform authentication protocol into a platform-level platform evaluation result for the access requester corresponding to the first set of component measurement request parameters.

An embodiment of the invention provides a second evaluation policy server in a TNC, which includes:

a receiving unit configured to receive a second set of component measurements; and a third obtaining unit is further configured, for each component type identifier in a second set of component measurement request parameters, to transmit the following information to corresponding upper integrity measurement verifiers:

information d which is the second set of component measurements;

information e which is a platform configuration protection policy corresponding to the component type identifier among platform configuration protection policies of the access controller corresponding to the second set of component measurement request parameters; and information f which is a platform evaluation policy corresponding to the component type identifier among platform evaluation policies of the access controller corresponding to the second set of component measurement request parameters;

then these integrity measurement verifiers return component product-level platform evaluation results, a difference platform evaluation policy and component remediation information corresponding to the component type identifier;

next the respective component product-level platform evaluation results corresponding to the component type identifier are converged into a component type-level platform evaluation result under the platform evaluation policy corresponding to the component type identifier among the platform evaluation policies for the access controller corresponding to the second set of component measurement request parameters, wherein a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information f, and each component attribute-level platform evaluation result corresponding to the component product sequence number is generated by the integrity measurement verifiers under a platform evaluation policy corresponding to the component attribute identifier corresponding to the component product sequence number in the information f and a platform evaluation policy corresponding to the component attribute identifier of the component product sequence number in the information e; and if the second set of component measurement request parameters are all of component measurement request parameters for the access controller, then the difference platform evaluation policies corresponding to these component type identifiers are converged into difference platform evaluation policies for the access controller corresponding to the second set of component measurement request parameters, and the component remediation information corresponding to these component type identifiers is converged into component remediation information for the access controller corresponding to the second set of component measurement request parameters; and if the platform evaluation policies for the access controller corresponding to the second set of component measurement request parameters include a component type-level convergence platform evaluation policy, then the evaluation policy server converges the component type-level platform evaluation results corresponding to these component type identifiers into a platform-level platform evaluation result for the access controller corresponding to the second set of component measurement request parameters under the component type-level convergence platform evaluation policy among the platform evaluation policies for the access controller corresponding to the second set of component measurement request parameters and transmits the generated information to a TNC access point.

With the technical solutions according to the embodiments of the invention, good application extensibility can be achieved for performing platform authentication of a TCA. In the embodiments of the invention, platform authentication policies for an access requester can be configured on a TNC access point or configured on an evaluation policy server, and the platform authentication policies for the access requester configured on the evaluation policy server can be transmitted to the TNC access point. Furthermore a component type-level convergence platform evaluation policy can be enforced on the TNC access point or on the evaluation policy server so that good application extensibility can be achieved for performing platform authentication of the TCA.

Performing platform authentication of the TCA can be made easier to thereby manage to enhance easy manageability of performing platform authentication of the TCA. In the embodiments of the invention, the evaluation policy server will not be involved in management of a network connection between any TNC client and the TNC access point in a platform authentication protocol so that performing platform authentication of the TCA can be made easier to manage to thereby enhance easy manageability of performing platform authentication of the TCA.

DETAILED DESCRIPTION OF THE EMBODIMENTS

Figure 1:
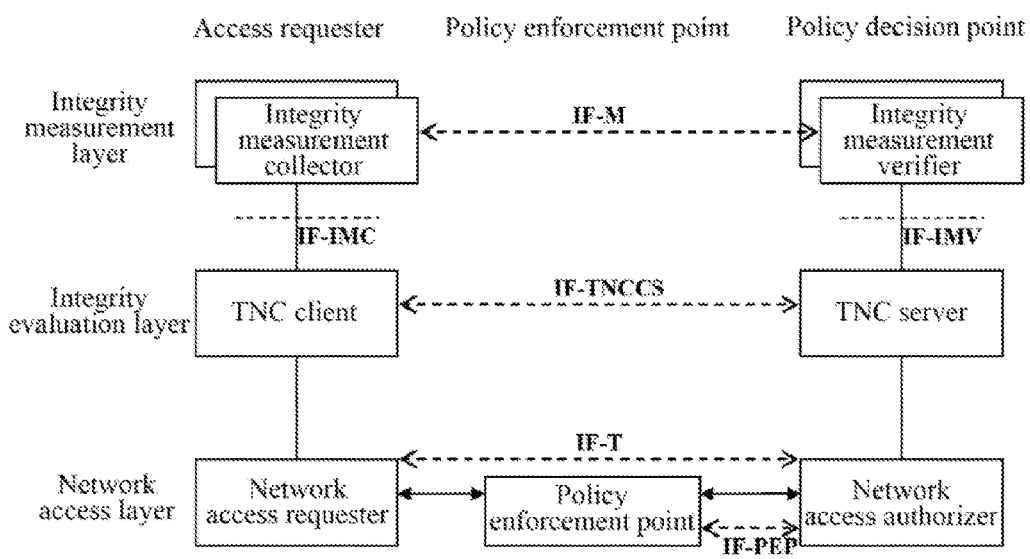
FIG. 1 is a schematic structural diagram of a TCG-TNC architecture in the prior art.
Figure 2:
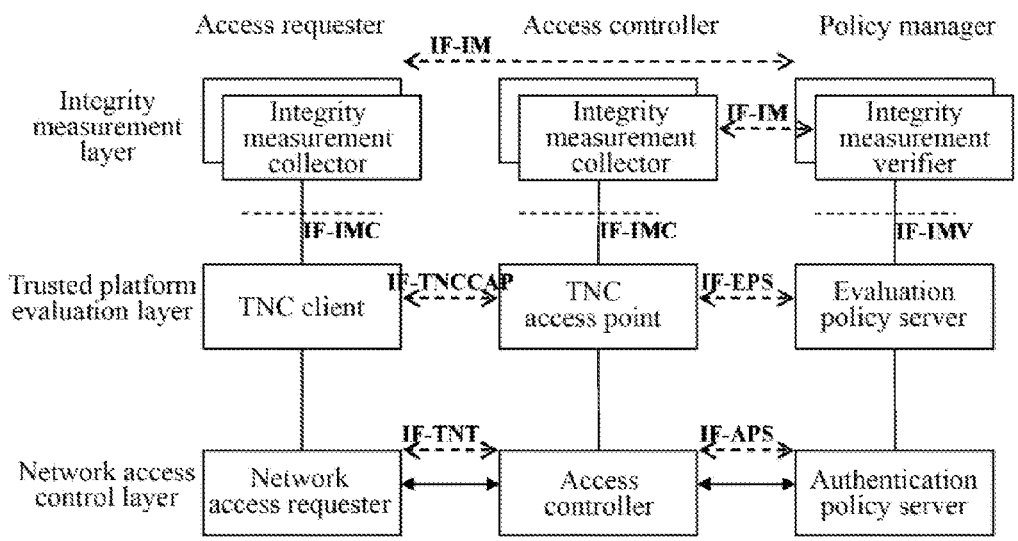
FIG. 2 is a schematic structural diagram of a trusted connection architecture in the prior art.

A platform authentication process involves a plurality of policies, where a platform authentication policy refers to a policy under which platform authentication is performed. A platform authentication management policy refers to a policy under which the platform authentication process is managed, for example, the platform authentication process is configured to be completed by executing one or more rounds of a platform authentication protocol. A platform configuration protection policy refers to a policy under which platform configuration is protected, for example, an operating system of a platform is configured to be protected. A platform evaluation policy refers to a policy under which the platform is evaluated, for example, an evaluation requirement on antivirus software of the platform is configured. A platform authentication action recommendation generation policy refers to a policy under which a platform authentication action recommendation is generated. The platform authentication action recommendation refers to a action recommendation generated upon completion of the platform authentication process.

The invention provides a platform authentication policy management method applicable to a trusted connection architecture, and this method includes the following steps:

Step 1) Platform authentication policies are configured;

Step 1.1) Platform authentication policies are configured on a TNC client, which include a platform authentication management policy of an access requester, platform configuration protection policies of the access requester, platform evaluation policies for an access controller and a platform authentication action recommendation generation policy of the access requester.

For the sake of a convenience description, hereinafter the platform authentication policies of the access requester will be simply referred to as first platform authentication policies, and correspondingly among them, the platform authentication management policy of the access requester will be simply referred to as a first platform authentication management policy, the platform configuration protection policies of the access requester will be simply referred to as first platform configuration protection policies, the platform evaluation policies for the access controller will be simply referred to as second platform evaluation policies, and the platform authentication action recommendation generation policy of the access requester will be simply referred to as a first platform authentication action recommendation generation policy.

Step 1.2) Platform authentication policies of the access controller are configured on a TNC access point or an evaluation policy server, which include a platform authentication management policy of the access controller, platform configuration protection policies of the access controller, platform evaluation policies for the access requester and a platform authentication action recommendation generation policy of the access controller.

For the sake of a convenience description, hereinafter the platform authentication policies of the access controller will be simply referred to as second platform authentication policies, and correspondingly among them, the platform authentication management policy of the access controller will be simply referred to as a second platform authentication management policy, the platform configuration protection policies of the access controller will be simply referred to as second platform configuration protection policies, the platform evaluation policies for the access requester will be simply referred to as second platform evaluation policies, and the platform authentication action recommendation generation policy of the access controller will be simply referred to as a second platform authentication action recommendation generation policy.

Step 2) If the second platform authentication policies are configured on the TNC access point in the step 1.2), then the TNC access point proceeds to the step 3) directly; and if the second platform authentication policies are configured on the evaluation policy server in the step 1.2), then the TNC access point requests the evaluation policy server for the platform authentication policies of the access controller, and then the evaluation policy server transmits the second platform authentication policies to the TNC access point, and then the TNC access point further proceeds to the step 3);

Step 3) The TNC access point initiates one round of a platform authentication protocol to the TNC client under the platform authentication management policy of the access controller and the platform evaluation policies for the access requester among the second platform authentication policies;

Step 3.1) All or a part of component measurement request parameters for the access requester are generated under the second platform authentication management policy and the first platform evaluation policies;

For the sake of a convenient description, the component measurement request parameters for the access requester generated in the step 3.1) will be simply referred hereinafter to as a first set of component measurement request parameters.

In general, platform authentication can be completed by initiating one round of the platform authentication protocol to the TNC client under the second platform authentication management policy and the first platform evaluation policies, and at this time the first set of component measurement request parameters include all of component measurement request parameters for the access requester, that is, all of the component measurement request parameters for the access requester. Platform authentication can alternatively be completed by initiating a plurality of rounds of the platform authentication protocol, and at this time the first set of component measurement request parameters generated in this step in each round of the platform authentication protocol include a part of component measurement request parameters for the access requester, that is, a part of the component measurement request parameters for the access requester.

Step 3.2) If the first set of component measurement request parameters are all of the component measurement request parameters for the access requester, then platform evaluation policies for the access requester corresponding to the first set of component measurement request parameters are generated under the first platform evaluation policies, where the platform evaluation policies for the access requester corresponding to the first set of component measurement request parameters may or may not include a component type-level convergence platform evaluation policy;

Step 3.3) If the first set of component measurement request parameters are a part of the component measurement request parameters for the access requester, then platform evaluation policies for the access requester corresponding to the first set of component measurement request parameters are generated under the first platform evaluation policies, where the platform evaluation policies for the access requester corresponding to the first set of component measurement request parameters do not include a component type-level convergence platform evaluation policy;

Step 3.4) The first set of component measurement request parameters are transmitted to the TNC client;

Step 4) The TNC client performs the following steps upon reception of the first set of component measurement request parameters:

Step 4.1) For the component measurement request parameter corresponding to each component type identifier in the first set of component measurement request parameters, the TNC client transmits the component measurement request parameter corresponding to the component type identifier to respective corresponding integrity measurement collectors above the TNC client, then these integrity measurement collectors return component measurements corresponding to the component type identifier to the TNC client, and finally the TNC client converges the received component measurements into component measurements of the access requester corresponding to the first set of component measurement request parameters;

For the sake of a convenient description, the component measurements of the access requester corresponding to the first set of component measurement request parameters will be simply referred hereinafter to as a first set of component measurements.

Step 4.2) All or a part of component measurement request parameters for the access controller are generated under the first platform authentication management policy and the second platform evaluation policies;

For the sake of a convenient description, the component measurement request parameters for the access controller generated in the step 4.2) will be simply referred hereinafter to as a second set of component measurement request parameters.

In general, platform authentication can be completed by initiating one round of the platform authentication protocol to the TNC client under the first platform authentication management policy and the second platform evaluation policies, and at this time the second set of component measurement request parameters include all of component measurement request parameters for the access controller, that is, all of the component measurement request parameters for the access controller. Platform authentication can alternatively be completed by initiating a plurality of rounds of the platform authentication protocol, and at this time the second set of component measurement request parameters generated in this step in each round of the platform authentication protocol include a part of component measurement request parameters for the access controller, that is, a part of the component measurement request parameters for the access controller.

Step 4.3) If the second set of component measurement request parameters are all of the component measurement request parameters for the access controller, then platform evaluation policies for the access controller corresponding to the second set of component measurement request parameters are generated under the second platform evaluation policies, where the platform evaluation policies for the access controller corresponding to the second set of component measurement request parameters may or may not include a component type-level convergence platform evaluation policy;

Step 4.4) If the second set of component measurement request parameters are a part of the component measurement request parameters for the access controller, then platform evaluation policies for the access controller corresponding to the second set of component measurement request parameters are generated under the platform evaluation policies for the access controller, where the platform evaluation policies for the access controller corresponding to the second set of component measurement request parameters do not include a component type-level convergence platform evaluation policy;

Step 4.5) Platform configuration protection policies of the access requester corresponding to the first set of component measurement request parameters are generated under the first platform configuration protection policies;

Step 4.6) The following information is transmitted to the TNC access point: a platform identity certificate of the access requester, the first set of component measurements, the platform configuration protection policies of the access requester corresponding to the first set of component measurement request parameters, the second set of component measurement request parameters, platform configuration protection policies for the access controller corresponding to the second set of component measurement request parameters, and a platform signature, included in the first set of component measurements, which is generated using the platform identity certificate of the access requester.

For the sake of a convenient description, the information transmitted from the TNC client to the TNC access point will be collectively referred hereinafter to as first set of platform authentication information.

Step 5) The TNC access point performs the following steps upon reception of the first set of platform authentication information transmitted from the TNC client:

Step 5.1) The platform signature in the first set of component measurements is verified against the platform identity certificate of the access requester, and if the verification is not passed, then the first set of platform authentication information is discarded; otherwise, the process proceeds to the step 5.2) to the step 5.4);

Step 5.2) For the component measurement request parameter corresponding to each component type identifier in the second set of component measurement request parameters, the TNC access point transmits the component measurement request parameter corresponding to the component type identifier to respective corresponding integrity measurement collectors above the TNC access point, then these integrity measurement collectors return component measurements corresponding to the component type identifiers to the TNC access point, and finally the TNC access point converges the received component measurements into component measurements of the access controller corresponding to the second set of component measurement request parameters;

For the sake of a convenient description, the component measurements of the access controller corresponding to the second set of component measurement request parameters will be simply referred hereinafter to as a second set of component measurements.

Step 5.3) Platform configuration protection polices of the access controller corresponding to the second set of component measurement request parameters are generated under the second platform configuration protection polices which may be configured by the TNC access point in the step 1) or transmitted from the evaluation policy server in the step 2).

Step 5.4) The following information is transmitted to the evaluation policy server: the platform identity certificate of the access requester, the component measurements of the access requester corresponding to the first set of component measurement request parameters, the platform configuration protection polices of the access requester corresponding to the first set of component measurement request parameters, the platform evaluation polices for the access requester corresponding to the first set of component measurement request parameters, a platform identity certificate of the access controller, the component measurements of the access controller corresponding to the second set of component measurement request parameters, the platform configuration protection polices of component measurements of the access controller corresponding to the second set of component measurement request parameters and the platform evaluation polices for the access controller corresponding to the second set of component measurement request parameters.

For the sake of a convenient description, the information transmitted from the TNC access point to the evaluation policy server will be collectively referred hereinafter to as second set of platform authentication information.

Step 6) The evaluation policy server performs the following steps upon reception of the second set of platform authentication information transmitted from the TNC access point:

Step 6.1) The platform identity certificate of the access requester and the platform identity certificate of the access controller are verified, and a platform identity certificate verification result of the access requester and a platform identity certificate verification result of the access controller are generated;

Step 6.2) If the platform identity certificate verification result of the access requester in the step 6.1) shows that the platform identity certificate verification result of the access requester is valid, then the process proceeds to the step 6.2.1) to the step 6.2.2); otherwise, the process proceeds to the step 6.4);

Step 6.2.1) For each component type identifier, the evaluation policy server transmits the following information corresponding to the component type identifier in the first set of component measurements to corresponding upper integrity measurement verifiers:

Information a which is the component measurements;

Information b which is the platform configuration protection policy corresponding to the component type identifier among the platform configuration protection policies of the access requester corresponding to the first set of component measurement request parameters; and Information c which is the platform evaluation policy corresponding to the component type identifier among the platform evaluation policies for the access requester corresponding to the first set of component measurement request parameters;

Then these integrity measurement verifiers return component product-level platform evaluation results, a difference platform evaluation policy and component remediation information corresponding to the component type identifier;

If the first set of component measurement request parameters are a part of the component measurement request parameters for the access requester, then the evaluation policy server converges the respective component product-level platform evaluation results corresponding to the component type identifier into a component type-level platform evaluation result under the platform evaluation policy corresponding to the component type identifier among the platform evaluation policies for the access requester corresponding to the first set of component measurement request parameters, where a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information c, and each component attribute-level platform evaluation result corresponding to the component product sequence number is generated by the integrity measurement verifiers under a platform evaluation policy corresponding to the component attribute identifier corresponding to the component product sequence number in the information c and a platform evaluation policy corresponding to the component attribute identifier of the component product sequence number in the information b;

Step 6.2.2) If the first set of component measurement request parameters are all of the component measurement request parameters for the access requester, then the evaluation policy server converges the difference platform evaluation policies and the component remediation information corresponding to these component type identifiers into difference platform evaluation policies for the access requester and component remediation information for the access requester corresponding to the first set of component measurement request parameters. If the platform evaluation policies for the access requester corresponding to the first set of component measurement request parameters include a component type-level convergence platform evaluation policy, then the evaluation policy server converges the component type-level platform evaluation results corresponding to these component type identifiers into a platform-level platform evaluation result for the access requester corresponding to the first set of component measurement request parameters under the component type-level convergence platform evaluation policy among the platform evaluation policies for the access requester corresponding to the first set of component measurement request parameters;

Step 6.3) If the platform identity platform verification result of the access controller in the step 6.1) shows that the platform identity certificate verification result of the access controller is valid, then the process proceeds to the step 6.3.1) to the step 6.3.2); otherwise, the process proceeds to the step 6.4);

Step 6.3.1) For each component type identifier, the evaluation policy server transmits the following information to corresponding upper integrity measurement verifiers:

Information d which is the second set of component measurements;

Information e which is the platform configuration protection policy corresponding to the component type identifier among the platform configuration protection policies of the access controller corresponding to the second set of component measurement request parameters; and Information f which is the platform evaluation policy corresponding to the component type identifier among the platform evaluation policies of the access controller corresponding to the second set of component measurement request parameters;

Then these integrity measurement verifiers return component product-level platform evaluation results, a difference platform evaluation policy and component remediation information corresponding to the component type identifier; and Next the evaluation policy server converges the respective component product-level platform evaluation results corresponding to the component type identifier into a component type-level platform evaluation result under the platform evaluation policy corresponding to the component type identifier among the platform evaluation policies for the access controller corresponding to the second set of component measurement request parameters, where a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information f, and each component attribute-level platform evaluation result corresponding to the component product sequence number is generated by the integrity measurement verifiers under a platform evaluation policy corresponding to the component attribute identifier corresponding to the component product sequence number in the information f and a platform evaluation policy corresponding to the component attribute identifier of the component product sequence number in the information e;

Step 6.3.2) If the second set of component measurement request parameters are all of the component measurement request parameters for the access controller, then the difference platform evaluation policies corresponding to these component type identifiers are converged into difference platform evaluation policies for the access controller corresponding to the second set of component measurement request parameters, and the component remediation information corresponding to these component type identifiers is converged into component remediation information for the access controller corresponding to the second set of component measurement request parameters. If the platform evaluation policies for the access controller corresponding to the second set of component measurement request parameters include a component type-level convergence platform evaluation policy, then the evaluation policy server converges the component type-level platform evaluation results corresponding to these component type identifiers into a platform-level platform evaluation result for the access controller corresponding to the second set of component measurement request parameters under the component type-level convergence platform evaluation policy among the platform evaluation policies for the access controller corresponding to the second set of component measurement request parameters; and Step 6.4) The information generated by the evaluation policy server in the step 6.1) to the step 6.3) to the TNC access point;

Step 7) The TNC access point performs the following steps upon reception transmitted from the evaluation policy server in the step 6.4):

Step 7.1) If the platform identity certificate verification result of the access requester shows that the platform identity certificate of the access requester is invalid, then the process proceeds to the step 7.5) to the step 7.7); otherwise, the process proceeds to the step 7.2) to the step 7.6);

Step 7.2) If the first set of component measurement request parameters are a part of the component measurement request parameters for the access requester and parts of the component measurement request parameters for the access requester generated by the TNC access point in the respective rounds of the platform authentication protocol constitute all of the component measurement request parameters for the access requester, then the TNC access point converges the component type-level platform evaluation results generated by the evaluation policy server in the respective rounds of the platform authentication protocol and converges the difference platform evaluation polices and the component remediation information generated by the evaluation policy server in the respective rounds of the platform authentication protocol into difference platform evaluation polices and component remediation information for the access requester; otherwise, the TNC access point initiates another round of the platform authentication protocol at the end of the current round of the platform authentication protocol;

Step 7.3) If the first set of component measurement request parameters are all of the component measurement request parameters for the access requester and the platform evaluation policies for the access requester corresponding to the first set of component measurement request parameters do not include a component type-level convergence platform evaluation policy, then the TNC access point converges the component type-level platform evaluation results generated by the evaluation policy server in the current round of the platform authentication protocol into a platform-level platform evaluation result for the access requester corresponding to the first set of component measurement request parameters;

Step 7.4) The component remediation information for the access requester corresponding to the first set of component measurement request parameters is transmitted to the respective corresponding integrity measurement collectors above the TNC access point per component type identifier;

Step 7.5) If the TNC access point is not required to initiate another round of the platform authentication protocol, then the TNC access point generates a platform authentication action recommendation of the access controller under the platform authentication action recommendation generation policy of the access controller on the platform identity certificate verification result of the access requester and the platform-level platform evaluation result for the access requester corresponding to the first set of component measurement request parameters, that is, the TNC access point generates a platform authentication action recommendation of the access controller on the platform identity certificate verification result of the access requester and the platform-level platform evaluation result for the access requester corresponding to the first set of component measurement request parameters under the platform authentication action recommendation generation policy of the access controller;

Step 7.6) The platform identity certificate of the access controller, platform signature in the component measurements of the access controller corresponding to the second set of component measurement request parameters, the platform identity certificate verification result of the access controller, the information generated by the evaluation policy in the step 6.3.1) to the step 6.3.2) and the platform authentication action recommendation of the access controller are transmitted to the TNC client;

Step 8) The TNC client performs the following steps upon reception of the information transmitted from the TNC access point in the step 7.6):

Step 8.1) The platform signature in the second set of component measurements is verified against the platform identity certificate of the access controller, and if the verification is not passed, then the information transmitted from the TNC access point in the step 7.6) is discarded; otherwise, the process proceeds to the step 8.2) to the step 8.8);

Step 8.2) If the platform identity certificate verification result of the access controller shows that the platform identity certificate of the access controller is invalid, then the process proceeds to the step 8.7) to the step 8.8); otherwise, the process proceeds to the step 8.3) to the step 8.8);

Step 8.3) If the second set of component measurement request parameters are a part of the component measurement request parameters for the access controller and parts of the component measurement request parameters for the access controller generated by the TNC client in the respective rounds of the platform authentication protocol constitute all of the component measurement request parameters for the access controller, then the TNC client converges the component type-level platform evaluation results corresponding to the respective component type identifiers generated by the evaluation policy server in the respective rounds of the platform authentication protocol and converges the difference platform evaluation polices and the component remediation information generated by the evaluation policy server in the respective rounds of the platform authentication protocol into difference platform evaluation polices and component remediation information for the access controller corresponding to the second set of component measurement request parameters; otherwise, the TNC client initiates another round of the platform authentication protocol at the end of the current round of the platform authentication protocol. If another round of the platform authentication protocol initiated from the TNC access point has not been received in a specific period of time, then the TNC client initiates on its own initiative another round of the platform authentication protocol;

Step 8.4) If the second set of component measurement request parameters are all of the component measurement request parameters for the access controller and the platform evaluation policies for the access controller corresponding to the second set of component measurement request parameters do not include a component type-level convergence platform evaluation policy, then the TNC client converges the component type-level platform evaluation results corresponding to the respective component type identifiers generated by the evaluation policy server in the step 6.3.1) in the current round of the platform authentication protocol into a platform-level platform evaluation result for the access controller corresponding to the second set of component measurement request parameters under the component type-level convergence platform evaluation policy among the platform evaluation policies for the access controller corresponding to the second set of component measurement request parameters;

Step 8.5) The component remediation information for the access controller corresponding to the second set of component measurement request parameters is transmitted to the respective corresponding integrity measurement collectors above the TNC client per component type identifier;

Step 8.6) If the information transmitted from the TNC access point in the step 7.6) includes the platform authentication action recommendation of the access controller, then the TNC clients transmits the platform authentication action recommendation of the access controller to the respective corresponding integrity measurement collectors above the TNC client;

Step 8.7) If the TNC client is not required to wait for initiation of another round of the platform authentication protocol by the TNC access point or initiates on its own initiative another round of the platform authentication protocol, then the TNC client generates a platform authentication action recommendation of the access requester on the platform identity certificate verification result of the access controller and the platform-level platform evaluation result for the access controller corresponding to the second set of component measurement request parameters under the platform authentication action recommendation generation policy of the access requester;

Step 8.8) If the TNC client generates the platform authentication action recommendation of the access requester in the step 8.7), then the platform authentication action recommendation of the access requester is transmitted to the TNC access point;

Step 9) The TNC access point transmits the authentication action recommendation of the access requester to the respective corresponding integrity measurement collectors above the TNC access point upon reception of the information transmitted from the TNC client in the step 8.8); and Step 10) If the access requester and/or the access controller are/is required to perform platform remediation, then they proceed to the step 3) to the step 9) again upon completion of platform remediation, where the difference platform evaluation policies for the access requester corresponding to the first set of component measurement request parameters are set as the platform evaluation policies for the access requester, and the difference platform evaluation policies for the access controller corresponding to the second set of component measurement request parameters are set as the platform evaluation policies for the access controller.

The foregoing embodiment is merely a preferred embodiment, and in the foregoing preferred embodiment, the platform authentication policy management method applicable to a trusted connection architecture according to the embodiment of the invention can be completed by initiating one round of the platform authentication protocol or by initiating a plurality of rounds of the platform authentication protocol in each of which both the access requester and the access controller are authenticated. Absolutely those skilled in the art can infer undoubtedly that the platform authentication policy management method applicable to a trusted connection architecture according to the embodiment of the invention can authenticate only the access requester or authenticate only the access controller in each round of the platform authentication protocol.

To authenticate the access requester in one round of the platform authentication protocol, only one round of the platform authentication protocol is required to be initiated, all of the component measurement request parameters for the access requester are generated in the one round of the platform authentication protocol, and platform authentication on the access requester is completed by performing the operations related to the access requester in the foregoing step 1) to step 10). To authenticate the access requester in a plurality of rounds of the platform authentication protocol, a plurality of rounds of the platform authentication protocol are required to be initiated, a part of the component measurement request parameters are generated in each round, the component measurement request parameters generated in the respective rounds constitute all of the component measurement request parameters for the access requester, and part of platform authentication on the access requester is completed by performing the operations related to the access requester in the foregoing step 1) to step 10) according to the generated component measurement request parameters in each round.

To authenticate the access controller in one round of the platform authentication protocol, only one round of the platform authentication protocol is required to be initiated, all of the component measurement request parameters for the access controller are generated in the one round of the platform authentication protocol, and platform authentication on the access controller is completed by performing the operations related to the access controller in the foregoing step 1) to step 10). To authenticate the access controller in a plurality of rounds of the platform authentication protocol, a plurality of rounds of the platform authentication protocol are required to be initiated, a part of the component measurement request parameters are generated in each round, the component measurement request parameters generated in the respective rounds constitute all of the component measurement request parameters for the access controller, and part of platform authentication on the access controller is completed by performing the operations related to the access controller in the foregoing step 1) to step 10) according to the generated component measurement request parameters in each round.

Those skilled in the art can appreciate that the signatures added in the relevant information, the platform identity certificate of the access requester and the platform identity certificate of the access controller are optional information in some of the foregoing steps and can be adopted in an improved solution to enhanced security of platform authentication. In some cases, the functions of the integrity measurement collectors above the TNC client can alternatively be integrated on the TNC client, or the functions of the integrity measurement collectors above the TNC access point can alternatively be integrated on the TNC access point. The functions of the integrity measurement collectors above the platform evaluation server can alternatively be integrated on the platform evaluation server.

In order to perform the foregoing platform authentication policy management method, embodiments of the invention further provide a TNC client, a TNC access point and a platform evaluation server with corresponding functions.

Figure 3:
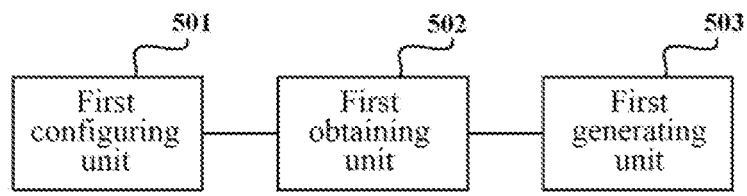
FIG. 3 is a structural block diagram of a client applicable to a trusted connection architecture according to an embodiment of the invention.

As illustrated in FIG. 3, a TNC client according to an embodiment of the invention includes:

A first configuring unit 301 configured to receive configured first platform authentication policies including a platform authentication management policy of an access requester, platform configuration protection policies of the access requester, platform evaluation policies for an access controller and a platform authentication action recommendation generation policy of the access requester;

A first obtaining unit 302 configured, upon reception of a first set of component measurement request parameters and platform evaluation policies for the access requester, to obtain a first set of component measurements corresponding to the first set of component measurement request parameters, to generate protection policies of the access requester corresponding to the first set of component measurement request parameters and to transmit the first set of component measurements, the received platform evaluation policies of the access requester and the generated protection policies of the access requester to a TNC access point; and A first generating unit 303 configured to generate and transmit to the TNC access point a platform action recommendation of the access requester.

Preferably the first obtaining unit 302 is further configured to transmit the component measurement request parameter corresponding to each component type identifier in the first set of component measurement request parameters to respective integrity measurement collectors corresponding to the TNC client upon reception of the first set of component measurement request parameters so that these integrity measurement collectors then return component measurements corresponding to the respective component type identifiers respectively to the TNC client, and the TNC client converges the received component measurements corresponding to the respective component type identifiers into a first set of component measurements corresponding to the first set of component measurement request parameters.

Preferably the first generating unit 303 is further configured to generate second set of component measurement request parameters for the access controller under the first platform authentication polices of the access requester and second platform authentication polices of the access controller.

Figure 4:
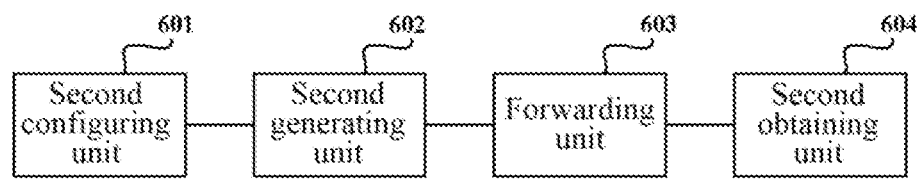
FIG. 4 is a structural block diagram of an access point applicable to a trusted connection architecture according to an embodiment of the invention.

As illustrated in FIG. 4, a TNC access point in a trusted connection architecture TNC according to an embodiment of the invention includes:

A second configuring unit 401 configured to receive configured second platform authentication policies including a platform authentication management policy of an access controller, platform configuration protection policies of the access controller, platform evaluation policies for an access requester and a platform authentication action recommendation generation policy of the access controller; or, when the second platform authentication policies are configured on an evaluation policy server, to request the evaluation policy server for the second platform authentication policies and to receive the second platform authentication policies transmitted from the evaluation policy server;

A second generating unit 402 configured to generate and transmit to a TNC client a first set of component measurement request parameters and platform evaluation policies for the access requester under the platform configuration protection policies of the access controller and the platform evaluation policies for the access requester among the second platform authentication policies to initiate one round of a platform authentication protocol, where if the first set of component measurement request parameters is all of component measurement request parameters for the access requester, then the platform evaluation policies for the access requester include a component type-level convergence platform evaluation policy;

A forwarding unit 403 configured to receive and forward, to the evaluation policy server, a first set of component measurements, the platform evaluation policies of the access requester and protection policies of the access requester transmitted from the TNC client; and A second obtaining unit 404 configured, when the first set of component measurement request parameters are all of the component measurement request parameters for the access requester and the platform evaluation policies for the access requester corresponding to the first set of component measurement request parameters do not include a component type-level convergence platform evaluation policy, for the TNC access point to converge component type-level platform evaluation results generated by the evaluation policy server in the current round of the platform authentication protocol into a platform-level platform evaluation result for the access requester corresponding to the first set of component measurement request parameters; to transmit component remediation information for the access requester corresponding to the first set of component measurement request parameters to respective corresponding integrity measurement collectors above the TNC access point per component type identifier; and to transmit the platform-level platform evaluation result for the access requester and the information transmitted from the evaluation policy server to the TNC client.

Furthermore the second obtaining unit 404 is further configured to obtain component measurements of the access controller corresponding to a second set of component measurement request parameters; and for the TNC access point to generate platform configuration protection policies of the access controller correspond to the second set of component measurement request parameters under the second platform configuration protection policies and to transmit the generated information together to the evaluation policy server.

Preferably the second obtaining unit 404 is further configured to transmit a component measurement request parameter corresponding to the component type identifier to the respective corresponding integrity measurement collectors above the TNC access point so that these integrity measurement collectors then return component measurements corresponding to the component type identifier to the TNC access point, and finally the TNC access point converges the received component measurements into component measurements of the access controller corresponding to the second set of component measurement request parameters.

Figure 5:
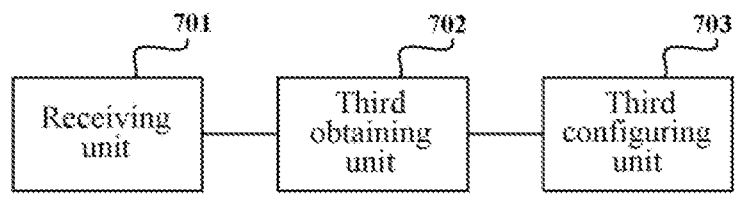
FIG. 5 is a structural block diagram of an evaluation policy server applicable to a trusted connection architecture according to an embodiment of the invention.

As illustrated in FIG. 5, a first platform evaluation server in a trusted connection architecture TNC according to an embodiment of the invention includes:

A receiving unit 501 configured to receive a first set of component measurements; and A third obtaining unit 502 configured, for each component type identifier, to transmit the following information corresponding to the component type identifier in the first set of component measurements to corresponding upper integrity measurement verifiers:

Information a which is the component measurements;

Information b which is a platform configuration protection policy corresponding to the component type identifier among platform configuration protection policies of an access requester corresponding to a first set of component measurement request parameters; and Information c which is a platform evaluation policy corresponding to the component type identifier among platform evaluation policies for the access requester corresponding to the first set of component measurement request parameters.

Then these integrity measurement verifiers return component product-level platform evaluation results, a difference platform evaluation policy and component remediation information corresponding to the component type identifier;

If the first set of component measurement request parameters are all of component measurement request parameters for the access requester, then the difference platform evaluation policies and the component remediation information corresponding to these component type identifiers are converged into difference platform evaluation policies for the access requester and component remediation information for the access requester corresponding to the first set of component measurement request parameters; and if the platform evaluation policies for the access requester corresponding to the first set of component measurement request parameters include a component type-level convergence platform evaluation policy, then component type-level platform evaluation results corresponding to these component type identifiers are converged into a platform-level platform evaluation result for the access requester corresponding to the first set of component measurement request parameters under the component type-level convergence platform evaluation policy among the platform evaluation policies for the access requester corresponding to the first set of component measurement request parameters; and If the first set of component measurement request parameters are all of the component measurement request parameters for the access requester and the platform evaluation policies for the access requester corresponding to the first set of component measurement request parameters do not include a component type-level convergence platform evaluation policy, then a TNC access point converges component type-level platform evaluation results generated by an evaluation policy server in the current round of a platform authentication protocol into a platform-level platform evaluation result for the access requester corresponding to the first set of component measurement request parameters.

Furthermore there is further included a third configuring unit 503 configured to receive configured second platform authentication policies and to transmit the configured second platform authentication policies to the TNC access point when the TNC access point requests for the second platform authentication policies.

Furthermore the receiving unit 501 is further configured to receive a second set of component measurements; and The third obtaining unit 502 is further configured, for each component type identifier in a second set of component measurement request parameters, to transmit the following information to corresponding upper integrity measurement verifiers:

Information d which is the second set of component measurements;

Information e which is a platform configuration protection policy corresponding to the component type identifier among platform configuration protection policies of the access controller corresponding to the second set of component measurement request parameters; and Information f which is a platform evaluation policy corresponding to the component type identifier among platform evaluation policies of the access controller corresponding to the second set of component measurement request parameters;

Then these integrity measurement verifiers return component product-level platform evaluation results, a difference platform evaluation policy and component remediation information corresponding to the component type identifier;

Next the respective component product-level platform evaluation results corresponding to the component type identifier are converged into a component type-level platform evaluation result under the platform evaluation policy corresponding to the component type identifier among the platform evaluation policies for the access controller corresponding to the second set of component measurement request parameters, where a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information f, and each component attribute-level platform evaluation result corresponding to the component product sequence number is generated by the integrity measurement verifiers under a platform evaluation policy corresponding to the component attribute identifier corresponding to the component product sequence number in the information f and a platform evaluation policy corresponding to the component attribute identifier of the component product sequence number in the information e; and If the second set of component measurement request parameters are all of component measurement request parameters for the access controller, then the difference platform evaluation policies corresponding to these component type identifiers are converged into difference platform evaluation policies for the access controller corresponding to the second set of component measurement request parameters, and the component remediation information corresponding to these component type identifiers is converged into component remediation information for the access controller corresponding to the second set of component measurement request parameters; and if the platform evaluation policies for the access controller corresponding to the second set of component measurement request parameters include a component type-level convergence platform evaluation policy, then the evaluation policy server converges the component type-level platform evaluation results corresponding to these component type identifiers into a platform-level platform evaluation result for the access controller corresponding to the second set of component measurement request parameters under the component type-level convergence platform evaluation policy among the platform evaluation policies for the access controller corresponding to the second set of component measurement request parameters and transmits the generated information to the TNC access point.

Still referring to FIG. 5, a second platform evaluation server in a trusted connection architecture TNC according to an embodiment of the invention includes:

A receiving unit 501 configured to receive a second set of component measurements; and A third obtaining unit 502 is further configured, for each component type identifier in a second set of component measurement request parameters, to transmit the following information to corresponding upper integrity measurement verifiers:

Information d which is the second set of component measurements;

Information e which is a platform configuration protection policy corresponding to the component type identifier among platform configuration protection policies of the access controller corresponding to the second set of component measurement request parameters; and Information f which is a platform evaluation policy corresponding to the component type identifier among platform evaluation policies of the access controller corresponding to the second set of component measurement request parameters;

Then these integrity measurement verifiers return component product-level platform evaluation results, a difference platform evaluation policy and component remediation information corresponding to the component type identifier;

Next the respective component product-level platform evaluation results corresponding to the component type identifier are converged into a component type-level platform evaluation result under the platform evaluation policy corresponding to the component type identifier among the platform evaluation policies for the access controller corresponding to the second set of component measurement request parameters, where a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information f, and each component attribute-level platform evaluation result corresponding to the component product sequence number is generated by the integrity measurement verifiers under a platform evaluation policy corresponding to the component attribute identifier corresponding to the component product sequence number in the information f and a platform evaluation policy corresponding to the component attribute identifier of the component product sequence number in the information e; and If the second set of component measurement request parameters are all of component measurement request parameters for the access controller, then the difference platform evaluation policies corresponding to these component type identifiers are converged into difference platform evaluation policies for the access controller corresponding to the second set of component measurement request parameters, and the component remediation information corresponding to these component type identifiers is converged into component remediation information for the access controller corresponding to the second set of component measurement request parameters; and if the platform evaluation policies for the access controller corresponding to the second set of component measurement request parameters include a component type-level convergence platform evaluation policy, then the evaluation policy server converges the component type-level platform evaluation results corresponding to these component type identifiers into a platform-level platform evaluation result for the access controller corresponding to the second set of component measurement request parameters under the component type-level convergence platform evaluation policy among the platform evaluation policies for the access controller corresponding to the second set of component measurement request parameters and transmits the generated information to a TNC access point.

With the technical solutions according to the embodiments of the invention, good application extensibility can be achieved for performing platform authentication of a TCA. In the embodiments of the invention, platform authentication policies for an access requester can be configured on a TNC access point or configured on an evaluation policy server, and the platform authentication policies for the access requester configured on the evaluation policy server can be transmitted to the TNC access point. Furthermore a component type-level convergence platform evaluation policy can be enforced on the TNC access point or on the evaluation policy server so that good application extensibility can be achieved for performing platform authentication of the TCA.

Performing platform authentication of the TCA can be made easier to thereby manage to enhance easy manageability of performing platform authentication of the TCA. In the embodiments of the invention, the evaluation policy server will not be involved in management of a network connection between any TNC client and the TNC access point in a platform authentication protocol so that performing platform authentication of the TCA can be made easier to manage to thereby enhance easy manageability of performing platform authentication of the TCA.

Figure 6:
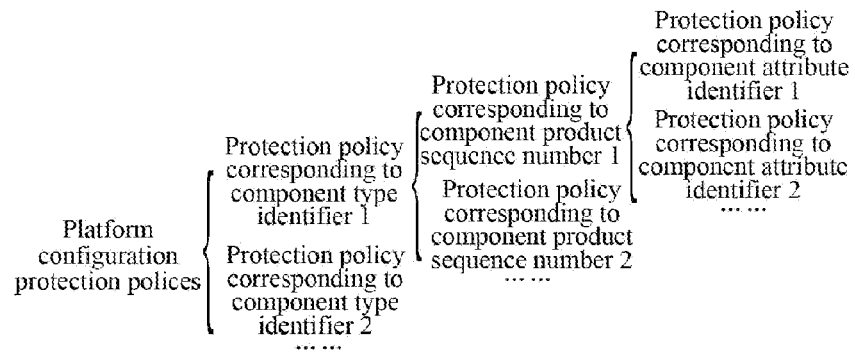
FIG. 6 is a schematic structural diagram of platform configuration protection policies according to an embodiment of the invention.

As illustrated in FIG. 6, there is a schematic structural diagram of the platform configuration protection policies in the respective steps above, where the platform configuration protection policies include a protection policy corresponding to a component type identifier 1, a protection policy corresponding to a component type identifier 2 and protection policies corresponding to other component type identifiers (represented as " . . . " in the figure); the platform configuration protection policy corresponding to the component type identifier 1 includes a protection policy corresponding to a component product sequence number 1, a protection policy corresponding to a component product sequence number 2 and protection policies corresponding to other component product sequence numbers (represented as " . . . " in the figure); the protection policy corresponding to the component type identifier 2 and the protection policies corresponding to the other component type identifiers are structurally identical to the protection policy corresponding to the component type identifier 1; the protection policy corresponding to the component product sequence number 1 includes a protection policy corresponding to a component attribute identifier 1, a protection policy corresponding to a component attribute identifier 2 and protection policies corresponding to other component attribute identifiers (represented as " . . . " in the figure); and the protection policy corresponding to the component product sequence number 2 and the protection policies corresponding to the other component product sequence numbers are structurally identical to the protection policy corresponding to the component product sequence number 1.

Particularly each component type identifier can identify a specific component type, e.g., a firewall type; each component product sequence number is a numerical sequence number of a component product generated locally by the TNC client or the TNC access point, e.g., 1, 2, . . . . . . ; and a component attribute is any attribute related to a component product, e.g., identification information, integrity and operation statuses, etc., of the component product; and the same will apply hereinafter.

Figure 7:
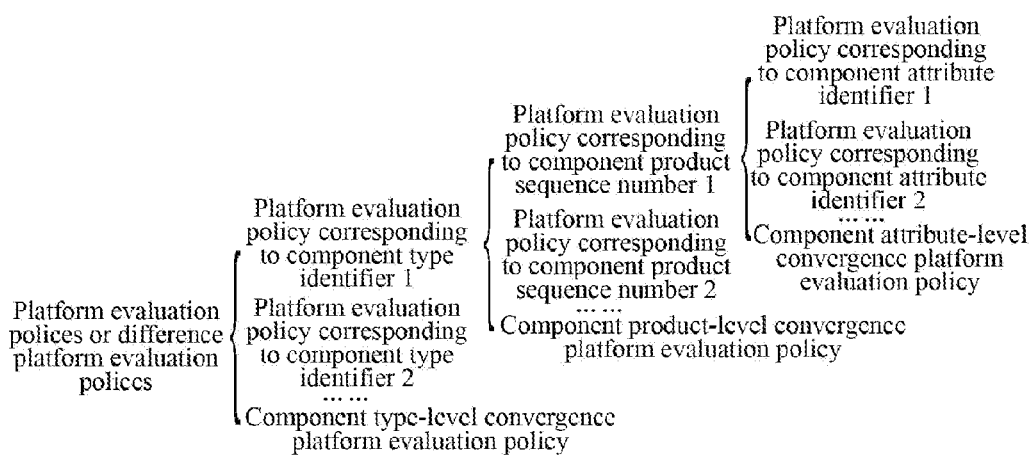
FIG. 7 is a schematic structural diagram of platform evaluation policies and difference platform evaluation policies according to an embodiment of the invention.

As illustrated in FIG. 7, there is a schematic structural diagram of the platform evaluation policies or the difference platform evaluation policies in the respective steps above, where the platform evaluation policies or the difference platform evaluation policies include a platform evaluation policy corresponding to a component type identifier 1, a platform evaluation policy corresponding to a component type identifier 2 and platform evaluation policies corresponding to other component type identifiers (represented as " . . . " in the figure) and a component type-level convergence platform evaluation policy; the platform evaluation policy corresponding to the component type identifier 1 includes a platform evaluation policy corresponding to a component product sequence number 1, a platform evaluation policy corresponding to a component product sequence number 2 and platform evaluation policies corresponding to other component product sequence numbers (represented as " . . . " in the figure) and a component product-level convergence platform evaluation policy; the platform evaluation policy corresponding to the component type identifier 2 and the platform evaluation policies corresponding to the other component type identifiers are structurally identical to the platform evaluation policy corresponding to the component type identifier 1; the platform evaluation policy corresponding to the component product sequence number 1 includes a platform evaluation policy corresponding to a component attribute identifier 1, a platform evaluation policy corresponding to a component attribute identifier 2 and platform evaluation policies corresponding to other component attribute identifiers (represented as " . . . " in the figure) and a component attribute-level convergence platform evaluation policy; and the platform evaluation policy corresponding to the component product sequence number 2 and the platform evaluation policies corresponding to the other component product sequence numbers are structurally identical to the platform evaluation policy corresponding to the component product sequence number 1.

Figure 8:
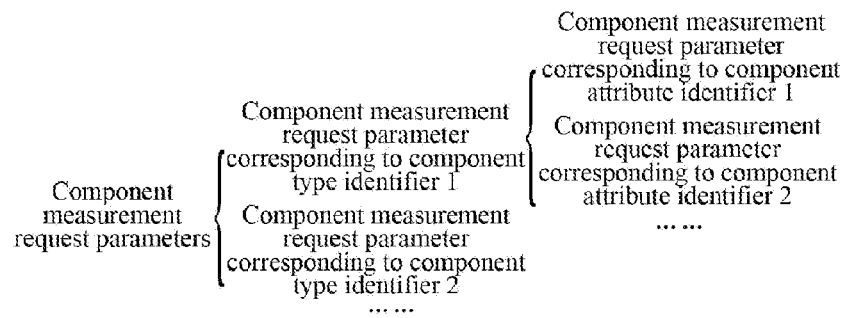
FIG. 8 is a schematic structural diagram of component measurement request parameters according to an embodiment of the invention.

As illustrated in FIG. 8, there is a schematic structural diagram of the component measurement request parameters in the respective steps above, where the component measurement request parameters include a component measurement request parameter corresponding to a component type identifier 1, a component measurement request parameter to a component type identifier 2 and component measurement request parameters corresponding to other component type identifiers (represented as " . . . " in the figure); the component measurement request parameter corresponding to the component type identifier 1 includes a component measurement request parameter corresponding to a component attribute identifier 1, a component measurement request parameter corresponding to a component attribute identifier 2 and component measurement request parameters corresponding to other component attribute identifiers (represented as " . . . " in the figure); and the component measurement request parameter corresponding to the component type identifier 2 and the component measurement request parameters corresponding to the other component type identifiers are structurally identical to the component measurement request parameter corresponding to the component type identifier 1.

Particularly each component attribute identifier can identify a specific component attribute, e.g., identification information, integrity and operation statuses, etc., of a component product, and the same will apply hereinafter.

Figure 9:
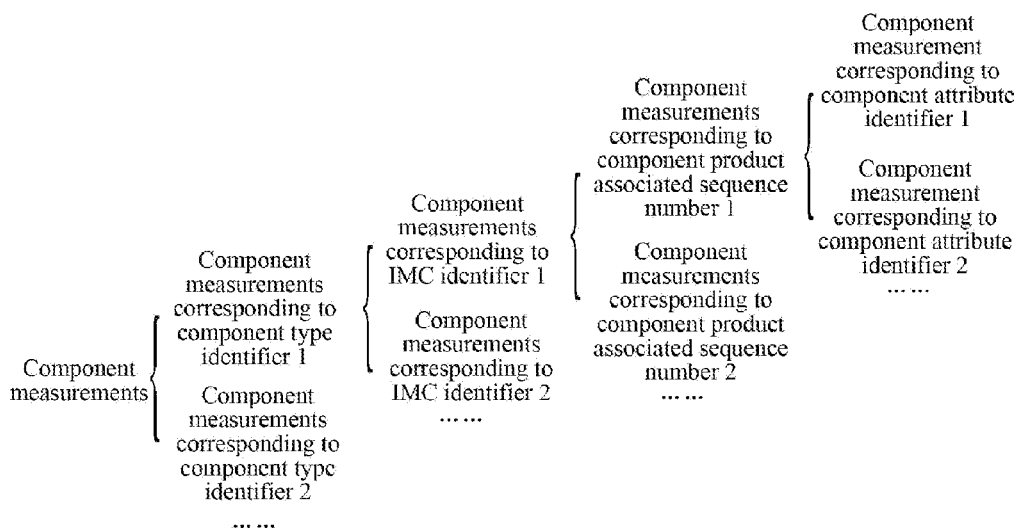
FIG. 9 is a schematic structural diagram of component measurements according to an embodiment of the invention.

As illustrated in FIG. 9, there is a schematic structural diagram of the component measurements in the respective steps above, where the component measurements include component measurements corresponding to a component type identifier 1, component measurements corresponding to a component type identifier 2 and component measurements corresponding to other component type identifiers (represented as " . . . " in the figure); the component measurements corresponding to the component type identifier 1 includes component measurements corresponding to an IMC identifier 1, component measurements corresponding to an IMC identifier 2 and component measurements corresponding to other IMC identifiers (represented as " . . . " in the figure); the component measurements corresponding to the component type identifier 2 and the component measurements corresponding to the component type identifiers are structurally identical to the component measurements corresponding to the component type identifier 1; the component measurements corresponding to the IMC identifier 1 includes component measurements corresponding to a component product associated sequence number 1, component measurements corresponding to a component product associated sequence number 2 and component measurements corresponding to other component product associated sequence numbers (represented as " . . . " in the figure); the component measurements corresponding to the IMC identifier 2 and the component measurements corresponding to the other IMC identifiers are structurally identical to the component measurements corresponding to the IMC identifier 1; the component measurements corresponding to the component product associated sequence number 1 includes a component measurement corresponding to a component attribute identifier 1, a component measurement corresponding to a component attribute identifier 2 and component measurements corresponding to other component attribute identifiers (represented as " . . . " in the figure); and the component measurement corresponding to the component product associated sequence number 2 and the component measurements corresponding to the other component product associated sequence numbers are structurally identical to the component measurement corresponding to the component product associated sequence number 1.

Particularly an IMC identifier can identify a specific IMC; and a component product associated sequence number is a numerical sequence number of a component product generated locally by an IMC.

Figure 10:
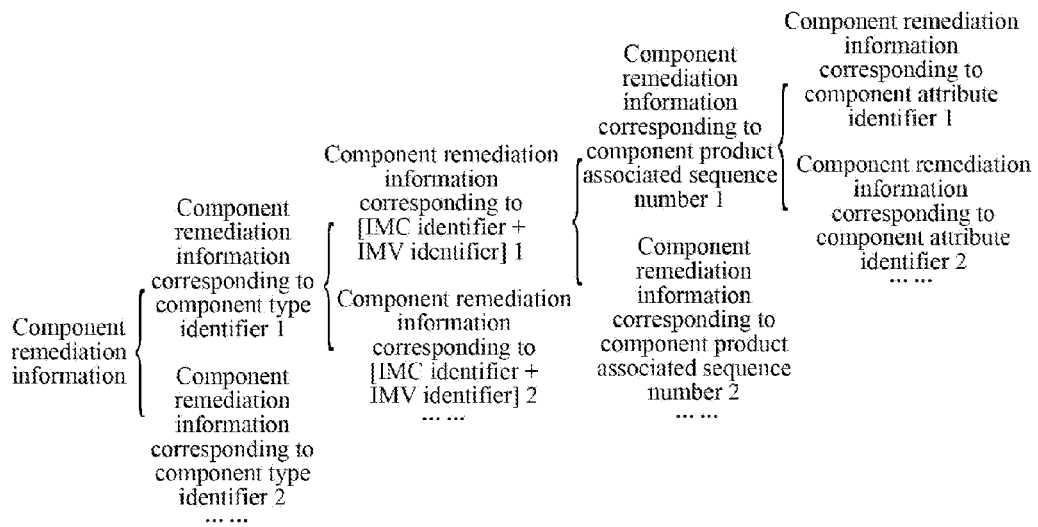
FIG. 10 is a schematic structural diagram of component remediation information according to an embodiment of the invention.

As illustrated in FIG. 10, there is a schematic structural diagram of the component remediation information in the respective steps above, where the component remediation information includes component remediation information corresponding to a component type identifier 1, component remediation information corresponding to a component type identifier 2 and component remediation information corresponding to other component type identifiers (illustrated as " . . . . . . " in the figure); the component remediation information corresponding to the component type identifier 1 includes component remediation information corresponding to an [IMC identifier+IMV identifier] 1, component remediation information corresponding to an [IMC identifier+IMV identifier] 2 and component remediation information corresponding to other [IMC identifiers+IMV identifiers] (illustrated as " . . . . . . " in the figure); the component remediation information corresponding to the component type identifier 2 and the component remediation information corresponding to the other component type identifiers is structurally identical to the component remediation information corresponding to the component type identifier 1; the component remediation information corresponding to an [IMC identifier+IMV identifier] 1 comprises component remediation information corresponding to a component product associated sequence 1, component remediation information corresponding to a component product associated sequence 2 and component remediation information corresponding to other component product associated sequences (illustrated as " . . . . . . " in the figure); the component remediation information corresponding to the [IMC identifier+IMV identifier] 2 and the component remediation information corresponding to the other [IMC identifiers+IMV identifiers] is structurally identical to the component remediation information corresponding to the [IMC identifier+IMV identifier] 1; the component remediation information corresponding to the component product associated sequence 1 includes component remediation information corresponding to a component attribute identifier 1, component remediation information corresponding to a component attribute identifier 2 and component remediation information corresponding to other component attribute identifiers (illustrated as " . . . . . . " in the figure); and the component remediation information corresponding to the component product associated sequence 2 and the component remediation information corresponding to the other component product associated sequences is structurally identical to the component remediation information corresponding to the component product associated sequence 1.

Particularly an IMV identifier in an [IMC identifier+IMV identifier] can identify a specific IMV; and an [IMC identifier+IMV identifier] identifies platform remediation information transmitted from a specific IMV to a specific IMC.

In the foregoing platform authentication policy management method, if a platform authentication protocol is not the first round of the platform authentication protocol, then the platform authentication protocol does not include relevant information of platform identity certificate verification.

In the foregoing platform authentication policy management method, bidirectional platform authentication between an access requester and an access controller can be performed, or unidirectional platform authentication of the access requester to the access controller or unidirectional platform authentication of the access controller to the access requester can be performed by selecting parameters of a platform authentication protocol in one direction for use.

There is a platform authentication policy management system applicable to a trusted connection architecture, and the system includes a TNC access point, a TNC client and an evaluation policy server, where the TNC access point initiates one round of a platform authentication protocol under a platform authentication management policy of an access controller and platform evaluation authentication policies for an access requester and transmits first information generated by the TNC point to the TNC client; the TNC client transmits second information to the TNC access point upon reception of the first information transmitted from the TNC access point; the TNC access point transmits third information to the evaluation policy server upon reception of the second information transmitted from the TNC client; the evaluation policy server transmits fourth information generated by the evaluation policy server to the TNC access point upon reception of the third information transmitted from the TNC access point; the TNC access point transmits fifth information to the TNC client upon reception of the fourth information transmitted from the evaluation policy server; the TNC client transmits sixth information to the TNC access point upon reception of the fifth information transmitted from the TNC access point; and the TNC access point transmits a platform authentication action recommendation of the access requester to respective corresponding integrity measurement collectors above the TNC access point upon reception of the sixth information transmitted from the TNC client.

Evidently those skilled in the art can make various remediations and variations to the invention without departing from the spirit and scope of the invention. Thus the invention is also intended to encompass these remediations and variations thereto so long as the remediations and variations come into the scope of the claims appended to the invention and their equivalents.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional remediations and variations to these embodiments. Accordingly the appended claims are intended to be construed as encompassing the preferred embodiments and all the remediations and variations coming into the scope of the invention.

Evidently those skilled in the art can make various remediations and variations to the embodiments of the invention without departing from the spirit and scope of the embodiments of the invention. Thus the invention is also intended to encompass these remediations and variations of the embodiments thereof so long as the remediations and variations come into the scope of the claims appended to the invention and their equivalents.

The invention claimed is:

1. A platform authentication policy management method applicable to a trusted connection architecture, comprising:
step 1, configuring, on a Trusted Network Connection, TNC, client, first platform authentication policies comprising a platform authentication management policy of an access requester, platform configuration protection policies of the access requester, platform evaluation policies for an access controller and a platform authentication action recommendation generation policy of the access requester; and
configuring, on a TNC access point or an evaluation policy server, second platform authentication policies comprising a platform authentication management policy of the access controller, platform configuration protection policies of the access controller, platform evaluation policies for the access requester and a platform authentication action recommendation generation policy of the access controller;
step 2, if the second platform authentication policies are configured on the evaluation policy server, then the TNC access point requesting the evaluation policy server for the second platform authentication policies, and then the evaluation policy server transmitting the configured second platform authentication policies to the TNC access point;
step 3, the TNC access point generating and transmitting to the TNC client a first set of component measurement request parameters and platform evaluation policies for the access requester under the platform authentication management policy of the access controller and the platform evaluation policies for the access requester among the second platform authentication policies to initiate one round of a platform authentication protocol, wherein if the first set of component measurement request parameters are all of component measurement request parameters for the access requester, then the platform evaluation policies for the access requester comprise a component type-level convergence platform evaluation policy;
step 4, the TNC client, upon reception of the first set of component measurement request parameters and the platform evaluation policies for the access requester, obtaining a first set of component measurements corresponding to the first set of component measurement request parameters, generating protection policies of the access requester corresponding to the first set of component measurement request parameters and transmitting the first set of component measurements, the received platform evaluation policies for the access requester and the generated protection policies of the access requester to the TNC access point;
step 5, the TNC access point receiving and forwarding to the evaluation policy server the first set of component measurements, the platform evaluation policies for the access requester and the protection policies of the access requester transmitted from the TNC client;
step 6, the evaluation policy server, for each component type identifier, transmitting the following information corresponding to the component type identifier in the first set of component measurements to corresponding upper integrity measurement verifiers:
information a which is the component measurements;
information b which is a platform configuration protection policy corresponding to the component type identifier among the platform configuration protection policies of the access requester corresponding to the first set of component measurement request parameters; and
information c which is a platform evaluation policy corresponding to the component type identifier among the platform evaluation policies for the access requester corresponding to the first set of component measurement request parameters;

then the integrity measurement verifiers returning component product-level platform evaluation results, a difference platform evaluation policy and component remediation information corresponding to the component type identifier;

if the first set of component measurement request parameters are all of the component measurement request parameters for the access requester, then the evaluation policy server converging difference platform evaluation policies and component remediation information corresponding to respective component type identifiers into difference platform evaluation policies for the access requester and component remediation information for the access requester corresponding to the first set of component measurement request parameters; and if the platform evaluation policies for the access requester corresponding to the first set of component measurement request parameters comprise a component type-level convergence platform evaluation policy, then the evaluation policy server converging component type-level platform evaluation results corresponding to the component type identifiers into a platform-level platform evaluation result for the access requester corresponding to the first set of component measurement request parameters under the component type-level convergence platform evaluation policy among the platform evaluation policies for the access requester corresponding to the first set of component measurement request parameters;

step 7, if the first set of component measurement request parameters are all of the component measurement request parameters for the access requester and the platform evaluation policies for the access requester corresponding to the first set of component measurement request parameters do not comprise a component type-level convergence platform evaluation policy, then the TNC access point converging the component type-level platform evaluation results generated by the evaluation policy server in the current round of the platform authentication protocol into a platform-level platform evaluation result for the access requester corresponding to the first set of component measurement request parameters; the TNC access point transmitting the component remediation information for the access requester corresponding to the first set of component measurement request parameters to respective corresponding integrity measurement collectors above the TNC access point per component type identifier; and the TNC access point transmitting the platform-level platform evaluation result for the access requester and the information transmitted from the evaluation policy server in step 6 to the TNC client;

step 8, the TNC client generating and transmitting to the TNC access point a platform action recommendation of the access requester;

step 9, the TNC access point transmitting the platform authentication action recommendation of the access requester to the respective corresponding upper integrity measurement collectors;

wherein if the first set of component measurement request parameters are a part of the component measurement request parameters for the access requester, then:

step 6 further comprises: the evaluation policy server converging the respective component product-level platform evaluation results corresponding to the component type identifier into a component type-level platform evaluation result under the platform evaluation policy corresponding to the component type identifier among the platform evaluation policies for the access requester corresponding to the first set of component measurement request parameters, wherein a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information c, and each component attribute-level platform evaluation result corresponding to the component product sequence number is generated by the integrity measurement verifiers under a platform evaluation policy corresponding to the component attribute identifier corresponding to the component product sequence number in the information c and a platform evaluation policy corresponding to the component attribute identifier of the component product sequence number in the information b; and step 7 further comprises: if parts of the component measurement request parameters for the access requester generated in respective rounds of the platform authentication protocol constitute all of the component measurement request parameters for the access requester, then the TNC access point converging component type-level platform evaluation results generated by the evaluation policy server in the respective rounds of the platform authentication protocol and converging difference platform evaluation polices and component remediation information generated by the evaluation policy server in the respective rounds of the platform authentication protocol into difference platform evaluation polices and component remediation information for the access requester; otherwise, the TNC access point initiating another round of the platform authentication protocol at the end of the current round of the platform authentication protocol;

wherein: step 4 further comprises: generating a second set of component measurement request parameters for the access controller under the first platform authentication management policy of the access requester and the second platform evaluation policies for the access controller; and if the second set of component measurement request parameters are all of component measurement request parameters for the access controller, then generating platform evaluation policies for the access controller corresponding to the second set of component measurement request parameters under the second platform evaluation policies, wherein the platform evaluation policies for the access controller corresponding to the second set of component measurement request parameters comprise a component type-level convergence platform evaluation policy, and transmitting the generated information together to the TNC access point;

step 5 further comprises: for a component measurement request parameter corresponding to each component type identifier in the second set of component measurement request parameters, the TNC access point obtaining component measurements of the access controller corresponding to the second set of component measurement request parameters; and the TNC access point generating platform configuration protection polices of the access controller corresponding to the second set of component measurement request parameters under the second platform configuration protection polices and transmitting the generated information together to the evaluation policy server;

step 6 further comprises: for each component type identifier in the second set of component measurement request parameters, the evaluation policy server transmitting the following information to the corresponding upper integrity measurement verifiers:

information d which is a second set of component measurements;

information e which is a platform configuration protection policy corresponding to the component type identifier among the platform configuration protection policies of the access controller corresponding to the second set of component measurement request parameters; and information f which is a platform evaluation policy corresponding to the component type identifier among the platform evaluation policies for the access controller corresponding to the second set of component measurement request parameters;

then the integrity measurement verifiers returning component product-level platform evaluation results, a difference platform evaluation policy and component remediation information corresponding to the component type identifier;

next the evaluation policy server converging the respective component product-level platform evaluation results corresponding to the component type identifier into a component type-level platform evaluation result under the platform evaluation policy corresponding to the component type identifier among the platform evaluation policies for the access controller corresponding to the second set of component measurement request parameters, wherein a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information f, and each component attribute-level platform evaluation result corresponding to the component product sequence number is generated by the integrity measurement verifiers under a platform evaluation policy corresponding to the component attribute identifier corresponding to the component product sequence number in the information f and a platform evaluation policy corresponding to the component attribute identifier of the component product sequence number in the information e; and if the second set of component measurement request parameters are all of the component measurement request parameters for the access controller, then converging the difference platform evaluation policies corresponding to the component type identifiers into difference platform evaluation policies for the access controller corresponding to the second set of component measurement request parameters, and converging the component remediation information corresponding to the component type identifiers into component remediation information for the access controller corresponding to the second set of component measurement request parameters; and if the platform evaluation policies for the access controller corresponding to the second set of component measurement request parameters comprise a component type-level convergence platform evaluation policy, then the evaluation policy server converging the component type-level platform evaluation results corresponding to the component type identifiers into a platform-level platform evaluation result for the access controller corresponding to the second set of component measurement request parameters under the component type-level convergence platform evaluation policy among the platform evaluation policies for the access controller corresponding to the second set of component measurement request parameters and transmitting the generated information to the TNC access point;

step 7 further comprises: if the TNC access point is not required to initiate another round of the platform authentication protocol, then generating and transmitting to the TNC client a platform authentication action recommendation of the access controller; and step 8 further comprises: if the second set of component measurement request parameters are all of the component measurement request parameters for the access controller and the platform evaluation policies for the access controller corresponding to the second set of component measurement request parameters do not comprise a component type-level convergence platform evaluation policy, then the TNC client converging the component type-level platform evaluation results corresponding to the respective component type identifiers generated by the evaluation policy server in step 6 in the current round of the platform authentication protocol into a platform-level platform evaluation result for the access controller corresponding to the second set of component measurement request parameters under the component type-level convergence platform evaluation policy among the platform evaluation policies for the access controller corresponding to the second set of component measurement request parameters;

the TNC client transmitting the component remediation information for the access controller corresponding to the second set of component measurement request parameters to respective corresponding integrity measurement collectors above the TNC client per component type identifier; and if the information transmitted from the TNC access point in step 7 comprises the platform authentication action recommendation of the access controller, then the TNC client transmitting the platform authentication action recommendation of the access controller to the respective corresponding integrity measurement collectors above the TNC client.

2. The method of claim 1, wherein the TNC client obtaining a first set of component measurements corresponding to the first set of component measurement request parameters upon reception of the first set of component measurement request parameters in the step 4 comprises:

the TNC client transmitting a component measurement request parameter corresponding to each component type identifier in the first set of component measurement request parameters to respective integrity measurement collectors corresponding to the TNC client upon reception of the first set of component measurement request parameters, then the integrity measurement collectors returning component measurements corresponding to respective component type identifiers respectively to the TNC client, and the TNC client converging the received component measurements corresponding to the respective component type identifiers into the first set of component measurements corresponding to the first set of component measurement request parameters.

3. The method of claim 2, wherein step 4 further comprises: the TNC client further transmitting a platform identity certificate of the access requester to the INC access point;
   step 5 further comprises; the TNC access point verifying a platform signature in the first set of component measurements against the platform identity certificate of the access requester, and the TNC access point further transmitting the platform identity certificate of the access requester and a platform identity certificate of the access controller to the evaluation policy server;
   step 6 further comprises: the evaluation policy server verifying the platform identity certificate of the access requester and the platform identity certificate of the access controller, generating a platform identity certificate verification result of the access requester and a platform identity certificate verification result of the access controller, and transmitting the verification results to the TNC access point;
   step 7 further comprises: the TNC access point determining whether the platform identity certificate of the access requester is valid according to the platform identity certificate verification result of the access requester, and transmitting the platform identity certificate and the platform identity certificate verification result of the access controller to the TNC client; and
   step 8 further comprises: the TNC client verifying a platform signature in a second set of component measurements against the platform identity certificate of the access controller, and determining whether the platform identity certificate of the access controller is valid according to the platform identity certificate verification result of the access controller.

4. The method of claim 1, wherein:
   the TNC access point obtaining component measurements of the access controller corresponding to the second set of component measurement request parameters in the step 4 comprises: the TNC access point transmitting the component measurement request parameter corresponding to the component type identifier to the respective corresponding integrity measurement collectors above the TNC access point, then the integrity measurement collectors returning component measurements corresponding to the component type identifier to the TNC access point, and finally the TNC access point converging the received component measurements into component measurements of the access controller corresponding to the second set of component measurement request parameters.

5. The method of claim 4, wherein step 4 further comprises: the TNC client further transmitting a platform identity certificate of the access requester to the TNC access point;
   step 5 further comprises: the TNC access point verifying a platform signature in the first set of component measurements against the platform identity certificate of the access requester, and the TNC access point further transmitting the platform identity certificate of the access requester and a platform identity certificate of the access controller to the evaluation policy server;
   step 6 further comprises: the evaluation policy server verifying the platform identity certificate of the access requester and the platform identity certificate of the access controller, generating a platform identity certificate verification result of the access requester and a platform identity certificate verification result of the access controller, and transmitting the verification results to the TNC access point;
   step 7 further comprises: the TNC access point determining whether the platform identity certificate of the access requester is valid according to the platform identity certificate verification result of the access requester, and transmitting the platform identity certificate and the platform identity certificate verification result of the access controller to the TNC client; and
   step 8 further comprises: the TNC client verifying a platform signature in a second set of component measurements against the platform identity certificate of the access controller, and determining whether the platform identity certificate of the access controller is valid according to the platform identity certificate verification result of the access controller.

6. The method of claim 4, wherein if the second set of component measurement request parameters are a part of the component measurement request parameters for the access controller, then:
   step 8 further comprises: if parts of the component measurement request parameters for the access controller generated by the TNC client in the respective rounds of the platform authentication protocol constitute all of the component measurement request parameters for the access controller, then the TNC client converging the component type-level platform evaluation results corresponding to the respective component type identifiers generated by the evaluation policy server in the respective rounds of the platform authentication protocol and converging the difference platform evaluation polices and the component remediation information generated by the evaluation policy server in the respective rounds of the platform authentication protocol into difference platform evaluation polices and component remediation information for the access controller corresponding to the second set of component measurement request parameters; otherwise, the TNC client initiating another round of the platform authentication protocol at the end of the current round of the platform authentication protocol; and if another round of the platform authentication protocol initiated from the TNC access point has not been received in a specific period of time, then the TNC client initiating on its own initiative another round of the platform authentication protocol.

7. The method of claim 1, wherein step 4 further comprises: the TNC client further transmitting a platform identity certificate of the access requester to the TNC access point;
   step 5 further comprises: the TNC access point verifying a platform signature in the first set of component measurements against the platform identity certificate of the access requester, and the TNC access point further transmitting the platform identity certificate of the access requester and a platform identity certificate of the access controller to the evaluation policy server;
   step 6 further comprises: the evaluation policy server verifying the platform identity certificate of the access requester and the platform identity certificate of the access controller, generating a platform identity certificate verification result of the access requester and a platform identity certificate verification result of the access controller, and transmitting the verification results to the TNC access point;
   step 7 further comprises: the TNC access point determining whether the platform identity certificate of the access requester is valid according to the platform identity certificate verification result of the access requester, and transmitting the platform identity certificate and the platform identity certificate verification result of the access controller to the TNC client; and step 8 further comprises: the TNC client verifying a platform signature in a second set of component measurements against the platform identity certificate of the access controller, and determining whether the platform identity certificate of the access controller is valid according to the platform identity certificate verification result of the access controller.

8. The method of claim 1, wherein step 4 further comprises: the TNC client further transmitting a platform identity certificate of the access requester to the TNC access point;

step 5 further comprises: the TNC access point verifying a platform signature in the first set of component measurements against the platform identity certificate of the access requester, and the TNC access point further transmitting the platform identity certificate of the access requester and a platform identity certificate of the access controller to the evaluation policy server;

step 6 further comprises: the evaluation policy server verifying the platform identity certificate of the access requester and the platform identity certificate of the access controller, generating a platform identity certificate verification result of the access requester and a platform identity certificate verification result of the access controller, and transmitting the verification results to the TNC access point;

step 7 further comprises: the TNC access point determining whether the platform identity certificate of the access requester is valid according to the platform identity certificate verification result of the access requester, and transmitting the platform identity certificate and the platform identity certificate verification result of the access controller to the TNC client; and step 8 further comprises: the TNC client verifying a platform signature in a second set of component measurements against the platform identity certificate of the access controller, and determining whether the platform identity certificate of the access controller is valid according to the platform identity certificate verification result of the access controller.

9. The method of claim 1, wherein step 4 further comprises: the TNC client further transmitting a platform identity certificate of the access requester to the TNC access point;

step 5 further comprises: the TNC access point verifying a platform signature in the first set of component measurements against the platform identity certificate of the access requester, and the TNC access point further transmitting the platform identity certificate of the access requester and a platform identity certificate of the access controller to the evaluation policy server;

step 6 further comprises: the evaluation policy server verifying the platform identity certificate of the access requester and the platform identity certificate of the access controller, generating a platform identity certificate verification result of the access requester and a platform identity certificate verification result of the access controller, and transmitting the verification results to the TNC access point;

step 7 further comprises: the TNC access point determining whether the platform identity certificate of the access requester is valid according to the platform identity certificate verification result of the access requester, and transmitting the platform identity certificate and the platform identity certificate verification result of the access controller to the TNC client; and step 8 further comprises: the TNC client verifying a platform signature in a second set of component measurements against the platform identity certificate of the access controller, and determining whether the platform identity certificate of the access controller is valid according to the platform identity certificate verification result of the access controller.

10. A client in a trusted connection architecture TNC, comprising:

a first configuring unit configured to receive configured first platform authentication policies comprising a platform authentication management policy of an access requester, platform configuration protection policies of the access requester, platform evaluation policies for an access controller and a platform authentication action recommendation generation policy of the access requester;

a first obtaining unit configured, upon reception of a first set of component measurement request parameters and platform evaluation policies for the access requester, to obtain a first set of component measurements corresponding to the first set of component measurement request parameters, to generate protection policies of the access requester corresponding to the first set of component measurement request parameters and to transmit the first set of component measurements, the received platform evaluation policies of the access requester and the generated protection policies of the access requester to a TNC access point; and a first generating unit configured to generate and transmit to the TNC access point a platform action recommendation of the access requester;

wherein the first generating unit is further configured to generate second set of component measurement request parameters for the access controller under the first platform authentication polices of the access requester and second platform authentication polices of the access controller;

wherein if the second set of component measurement request parameters are all of component measurement request parameters for the access controller, then generating platform evaluation policies for the access controller corresponding to the second set of component measurement request parameters under the second platform evaluation policies, wherein the platform evaluation policies for the access controller corresponding to the second set of component measurement request parameters comprise a component type-level convergence platform evaluation policy, and transmitting the generated information together to the TNC access point;

the first obtaining unit is further configured, upon reception of the platform authentication action recommendation of the access controller, to transmit the platform authentication action recommendation of the access controller to the respective corresponding integrity measurement collectors above the TNC client; and if the second set of component measurement request parameters are all of the component measurement request parameters for the access controller and the platform evaluation policies for the access controller corresponding to the second set of component measurement request parameters do not comprise a component type-level convergence platform evaluation policy, then the first generating unit is further configured to converge the component type-level platform evaluation results corresponding to the respective component type identifiers generated by the evaluation policy server in the current round of the platform authentication protocol into a platform-level platform evaluation result for the access controller corresponding to the second set of component measurement request parameters under the component type-level convergence platform evaluation policy among the platform evaluation policies for the access controller corresponding to the second set of component measurement request parameters; and the first generating unit is further configured to transmit the component remediation information for the access controller corresponding to the second set of component measurement request parameters to respective corresponding integrity measurement collectors above the TNC client per component type identifier.

11. The client of claim 10, wherein the first obtaining unit is further configured to transmit the component measurement request parameter corresponding to each component type identifier in the first set of component measurement request parameters to respective integrity measurement collectors corresponding to the TNC client upon reception of the first set of component measurement request parameters so that these integrity measurement collectors then return component measurements corresponding to the respective component type identifiers respectively to the TNC client, and the TNC client converges the received component measurements corresponding to the respective component type identifiers into a first set of component measurements corresponding to the first set of component measurement request parameters.

12. A Trusted Network Connection, TNC, access point in a trusted connection architecture TNC, comprising:

a configuring unit configured to receive configured second platform authentication policies comprising a platform authentication management policy of an access controller, platform configuration protection policies of the access controller, platform evaluation policies for an access requester and a platform authentication action recommendation generation policy of the access controller; or, when the second platform authentication policies are configured on an evaluation policy server, to request the evaluation policy server for the second platform authentication policies and to receive the second platform authentication policies transmitted from the evaluation policy server;

a generating unit configured to generate and transmit to a TNC client a first set of component measurement request parameters and platform evaluation policies for the access requester under the platform configuration protection policies of the access controller and the platform evaluation policies for the access requester among the second platform authentication policies to initiate one round of a platform authentication protocol, wherein if the first set of component measurement request parameters is all of component measurement request parameters for the access requester, then the platform evaluation policies for the access requester comprise a component type-level convergence platform evaluation policy;

a forwarding unit configured to receive and forward, to the evaluation policy server, a first set of component measurements, the platform evaluation policies of the access requester and protection policies of the access requester transmitted from the TNC client; and an obtaining unit configured, when the first set of component measurement request parameters are all of the component measurement request parameters for the access requester and the platform evaluation policies for the access requester corresponding to the first set of component measurement request parameters do not comprise a component type-level convergence platform evaluation policy, for the TNC access point to converge component type-level platform evaluation results generated by the evaluation policy server in the current round of the platform authentication protocol into a platform-level platform evaluation result for the access requester corresponding to the first set of component measurement request parameters; to transmit component remediation information for the access requester corresponding to the first set of component measurement request parameters to respective corresponding integrity measurement collectors above the TNC access point per component type identifier; and to transmit the platform-level platform evaluation result for the access requester and the information transmitted from the evaluation policy server to the TNC client;

wherein, the obtaining unit is further configured to obtain component measurements of the access controller corresponding to a second set of component measurement request parameters; and for the TNC access point to generate platform configuration protection policies of the access controller correspond to the second set of component measurement request parameters under the second platform configuration protection policies and to transmit the generated information together to the evaluation policy server; and wherein the obtaining unit is further configured to transmit a component measurement request parameter corresponding to the component type identifier to the respective corresponding integrity measurement collectors above the TNC access point so that these integrity measurement collectors then return component measurements corresponding to the component type identifier to the TNC access point, and finally the TNC access point converges the received component measurements into component measurements of the access controller corresponding to the second set of component measurement request parameters; and the obtaining unit is further configured to receive a platform-level platform evaluation result for the access controller corresponding to the second set of component measurement request parameters; and the obtaining unit is further configured to generate and transmit to the TNC client a platform authentication action recommendation of the access controller.

13. A platform evaluation server in a trusted connection architecture, TNC, comprising:

a receiving unit configured to receive a first set of component measurements; and an obtaining unit configured, for each component type identifier, to transmit the following information corresponding to the component type identifier in the first set of component measurements to corresponding upper integrity measurement verifiers:

information a which is the component measurements;

information b which is a platform configuration protection policy corresponding to the component type identifier among platform configuration protection policies of an access requester corresponding to a first set of component measurement request parameters; and information c which is a platform evaluation policy corresponding to the component type identifier among platform evaluation policies for the access requester corresponding to the first set of component measurement request parameters;

then these integrity measurement verifiers return component product-level platform evaluation results, a difference platform evaluation policy and component remediation information corresponding to the component type identifier;

if the first set of component measurement request parameters are all of component measurement request parameters for the access requester, then the difference platform evaluation policies and the component remediation information corresponding to these component type identifiers are converged into difference platform evaluation policies for the access requester and component remediation information for the access requester corresponding to the first set of component measurement request parameters; and if the platform evaluation policies for the access requester corresponding to the first set of component measurement request parameters comprise a component type-level convergence platform evaluation policy, then component type-level platform evaluation results corresponding to these component type identifiers are converged into a platform-level platform evaluation result for the access requester corresponding to the first set of component measurement request parameters under the component type-level convergence platform evaluation policy among the platform evaluation policies for the access requester corresponding to the first set of component measurement request parameters; and if the first set of component measurement request parameters are all of the component measurement request parameters for the access requester and the platform evaluation policies for the access requester corresponding to the first set of component measurement request parameters do not comprise a component type-level convergence platform evaluation policy, then a TNC access point converges component type-level platform evaluation results generated by an evaluation policy server in the current round of a platform authentication protocol into a platform-level platform evaluation result for the access requester corresponding to the first set of component measurement request parameters;

wherein, the receiving unit is further configured to receive a second set of component measurements; and the obtaining unit is further configured, for each component type identifier in a second set of component measurement request parameters, to transmit the following information to corresponding upper integrity measurement verifiers:

information d which is the second set of component measurements;

information e which is a platform configuration protection policy corresponding to the component type identifier among platform configuration protection policies of the access controller corresponding to the second set of component measurement request parameters; and information f which is a platform evaluation policy corresponding to the component type identifier among platform evaluation policies of the access controller corresponding to the second set of component measurement request parameters;

then these integrity measurement verifiers return component product-level platform evaluation results, a difference platform evaluation policy and component remediation information corresponding to the component type identifier;

next the respective component product-level platform evaluation results corresponding to the component type identifier are converged into a component type-level platform evaluation result under the platform evaluation policy corresponding to the component type identifier among the platform evaluation policies for the access controller corresponding to the second set of component measurement request parameters, wherein a component product-level platform evaluation result corresponding to each component product sequence number corresponding to the component type identifier is generated by the integrity measurement verifiers converging respective component attribute-level platform evaluation results corresponding to the component product sequence number under a component attribute-level convergence platform evaluation policy corresponding to the component product sequence number in the information f, and each component attribute-level platform evaluation result corresponding to the component product sequence number is generated by the integrity measurement verifiers under a platform evaluation policy corresponding to the component attribute identifier corresponding to the component product sequence number in the information f and a platform evaluation policy corresponding to the component attribute identifier of the component product sequence number in the information e; and if the second set of component measurement request parameters are all of component measurement request parameters for the access controller, then the difference platform evaluation policies corresponding to these component type identifiers are converged into difference platform evaluation policies for the access controller corresponding to the second set of component measurement request parameters, and the component remediation information corresponding to these component type identifiers is converged into component remediation information for the access controller corresponding to the second set of component measurement request parameters; and if the platform evaluation policies for the access controller corresponding to the second set of component measurement request parameters comprise a component type-level convergence platform evaluation policy, then the evaluation policy server converges the component type-level platform evaluation results corresponding to these component type identifiers into a platform-level platform evaluation result for the access controller corresponding to the second set of component measurement request parameters under the component type-level convergence platform evaluation policy among the platform evaluation policies for the access controller corresponding to the second set of component measurement request parameters and transmits the generated information to the TNC access point.

14. The platform evaluation server of claim 13, further comprising:

a configuring unit configured to receive configured second platform authentication policies and to transmit the configured second platform authentication policies to the TNC access point when the TNC access point requests for the second platform authentication policies.

* * * * *